US010604398B2

(12) United States Patent
Smeller et al.

(10) Patent No.: US 10,604,398 B2
(45) Date of Patent: Mar. 31, 2020

(54) METHOD AND APPARATUS FOR POST-MIX DRINK DISPENSING

(71) Applicant: Lancer Corporation, San Antonio, TX (US)

(72) Inventors: Donald W. Smeller, Converse, TX (US); Robert L. Robinson, Universal City, TX (US); Brandon P. Ojeda, San Antonio, TX (US); Linda M. Voller, Adkins, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 16/406,209

(22) Filed: May 8, 2019

(65) Prior Publication Data

US 2019/0263650 A1 Aug. 29, 2019

Related U.S. Application Data

(62) Division of application No. 15/915,450, filed on Mar. 8, 2018, now Pat. No. 10,351,409.

(60) Provisional application No. 62/594,935, filed on Dec. 5, 2017, provisional application No. 62/471,615, filed on Mar. 15, 2017.

(51) Int. Cl.
*B67D 1/00* (2006.01)
*B67D 1/12* (2006.01)
*B67D 1/08* (2006.01)

(52) U.S. Cl.
CPC ............ *B67D 1/0037* (2013.01); *B67D 1/005* (2013.01); *B67D 1/0045* (2013.01); *B67D 1/0048* (2013.01); *B67D 1/1204* (2013.01); *B67D 1/1295* (2013.01); *B67D 1/0036* (2013.01); *B67D 1/0891* (2013.01); *B67D 1/12* (2013.01);
(Continued)

(58) Field of Classification Search
CPC .... B67D 1/0037; B67D 1/005; B67D 1/1204; B67D 1/1215
See application file for complete search history.

(56) References Cited

U.S. PATENT DOCUMENTS 4,042,151 A 8/1977 Uttech
5,163,587 A 11/1992 Apps et al.
(Continued)

OTHER PUBLICATIONS

Written Opinion of the International Search Authority Issued in PCT Application No. PCT/US18/21682 which claims priority to Parent U.S. Appl. No. 15/915,450.

*Primary Examiner* — Jeremy Carroll
(74) *Attorney, Agent, or Firm* — Christopher L. Makay

(57) ABSTRACT

A high diluent to concentrate volumetric ratio post-mix drink dispenser includes a mixer and a nozzle housing. The mixer defines a mixing pathway adapted to receive a diluent flow from a diluent source and a concentrate pathway adapted to receive a concentrate flow from a concentrate source. The concentrate pathway communicates with the mixing pathway to deliver concentrate therein. The mixing pathway manipulates the diluent flow therein to decrease the pressure thereof, thereby creating a low pressure region at the concentrate pathway that promotes introduction of the concentrate into the diluent for mixing therewith. The nozzle housing couples with the mixer such that the nozzle housing receives mixed diluent and concentrate from the mixing pathway and delivers the mixed diluent and concentrate therefrom.

13 Claims, 23 Drawing Sheets

(52) U.S. Cl.
CPC .... *B67D 1/1279* (2013.01); *B67D 2001/0827* (2013.01); *B67D 2210/00049* (2013.01)

(56) References Cited

U.S. PATENT DOCUMENTS

| | | | | |
|---|---|---|---|---|
| 5,845,815 | A * | 12/1998 | Vogel | B67D 1/12 |
| | | | | 222/129.1 |
| 7,111,759 | B1 * | 9/2006 | Gorski | B67D 1/0021 |
| | | | | 222/145.6 |
| 9,821,992 | B2 * | 11/2017 | Rudick | B67D 1/0025 |
| 2004/0217129 | A1 * | 11/2004 | Roekens | B01F 3/0811 |
| | | | | 222/129.1 |
| 2007/0131715 | A1 * | 6/2007 | Minard | B67D 1/0044 |
| | | | | 222/145.5 |
| 2009/0032609 | A1 | 2/2009 | Ziesel | |
| 2009/0230149 | A1 * | 9/2009 | Smeller | B67D 1/0024 |
| | | | | 222/145.5 |
| 2012/0138632 | A1 | 6/2012 | Li et al. | |

* cited by examiner

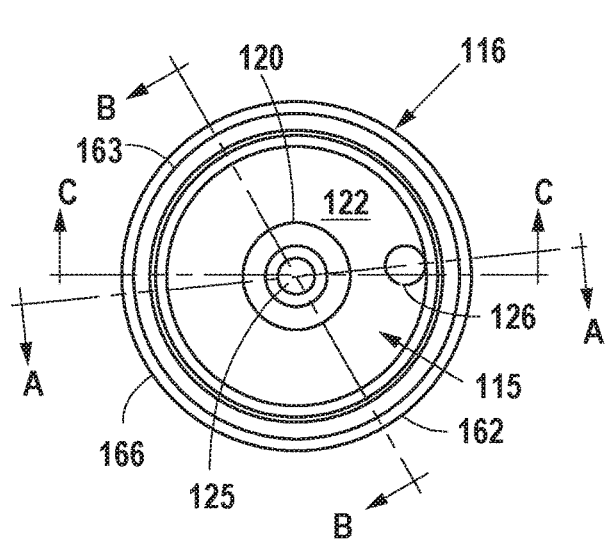
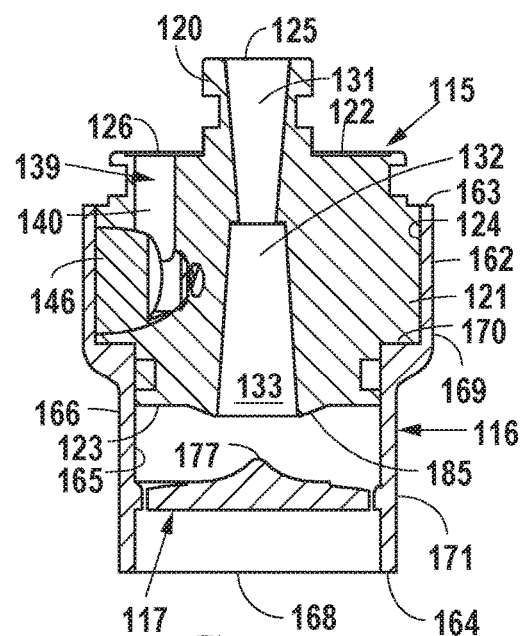
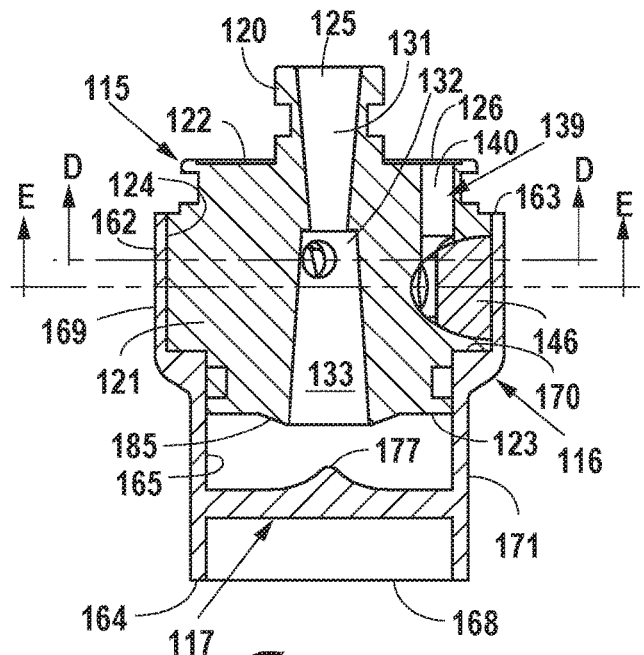
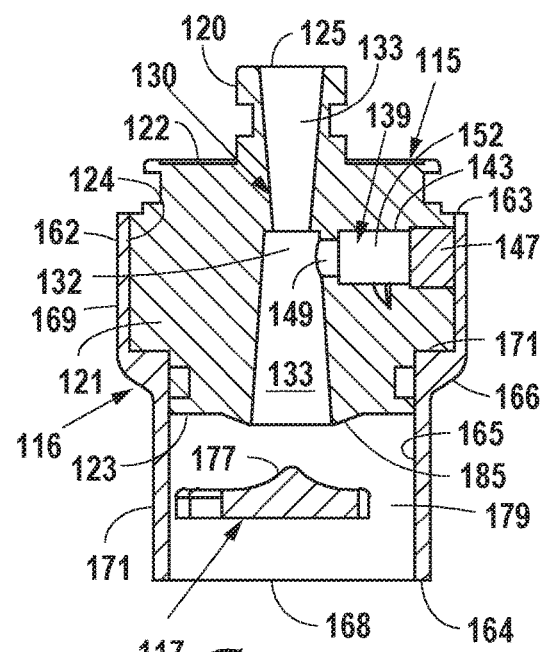

METHOD AND APPARATUS FOR POST-MIX DRINK DISPENSING

CROSS-REFERENCE TO RELATED APPLICATION

This present application claims all available benefit, under 35 U.S.C. § 119(e), of U.S. provisional patent application Ser. No. 62/471,615 filed Mar. 15, 2017 and U.S. provisional patent application Ser. No. 62/594,935 filed Dec. 5, 2017. By this reference, the full disclosures of U.S. provisional patent application Ser. Nos. 62/471,615 and 62/594,935 are incorporated herein as though now set forth in its entirety.

BACKGROUND OF THE INVENTION

1. Field of the Invention

The present invention relates to post-mix drink dispensing, and, more particularly, but not by way of limitation, to high diluent to concentrate volumetric ratio post-mix drink dispensing systems.

2. Description of the Related Art

Juices, iced coffee, tea, juice or sweetener (e.g., honey) infused water, and the like are increasing in popularity and demand among consumers. With this increased popularity and demand, the drink dispensing industry finds it necessary to formulate these drinks from a concentrate and a diluent and dispense them from post-mix drink dispensers. Unfortunately, post-mix dispensing such drinks presents problems to the drink dispensing industry not encountered with other currently available concentrates. In particular, the concentrates are highly viscous and thus must be dispensed in a high diluent to concentrate ratio. Illustratively, certain sweeteners such as honey are naturally highly viscous, and other concentrates such as teas and juices (e.g., coconut, acai, mango, papaya) are formulated with significantly reduced water contents that limit bacterial growth, thereby creating extremely shelf stable concentrates. Furthermore, the concentrates often include particulates that present challenges during post-mix dispensing.

Currently available post-mix drink dispensers, which normally dispense diluent to concentrate in a volumetric ratio of 5 to 1, include diluent and concentrate flow rate controllers consisting of a spring-loaded, finely honed, ceramic piston that moves axially within a similarly manufactured ceramic sleeve. A concentrate flow controller conveys 1 part of concentrate to a dispensing nozzle, which, in turn, jets the concentrate therefrom. A diluent flow controller conveys 5 parts of diluent to the dispensing nozzle, which, in turn, delivers the diluent therefrom in a hollow cone surrounding the jetted concentrate. The jetted concentrate contacts the hollow cone of surrounding diluent in mid-air, thereby mixing the concentrate and diluent as they enter a cup.

While currently available post-mix drink dispensers suitably dispense lower viscosity concentrates, they are less than satisfactory in dispensing highly viscous concentrates. Highly viscous concentrates due to their increased concentrations require dispensing with diluent in volumetric ratios (e.g., 24 to 1) greater than the typical 5 to 1 diluent to concentrate volumetric ratio. As a result, a highly viscous concentrate entering a dispensing nozzle in a reduced volume does not jet from the dispensing nozzle but instead dribbles therefrom, resulting in its failure to mix with exiting diluent and its collection undissolved in the bottom of a cup. Moreover, particulates in certain highly viscous concentrates lodge between the ceramic piston and the ceramic sleeve of the concentrate flow controller, causing striction such that the flow controller delivers an incorrect amount of concentrate, resulting in a poor tasting drink that has either too much or too little concentrate.

Accordingly, a post-mix drink dispenser suitable to dispense highly viscous concentrates in a desired high diluent to concentrate volumetric ratio will meet new demands in the drink dispensing industry.

SUMMARY OF THE INVENTION

In accordance with the present invention, a high diluent to concentrate volumetric ratio post-mix drink dispenser incorporates into a drink dispensing system to provide the drink dispensing system with the capability to dispense high diluent to concentrate volumetric ratio post-mix drinks. The high diluent to concentrate volumetric ratio post-mix drink dispenser includes a mixer and a nozzle housing coupled with the mixer. The mixer includes a mounting member securable with the nozzle housing that facilitates incorporation of the high diluent to concentrate volumetric ratio post-mix drink dispenser into a drink dispensing system. The mixer defines a mixing pathway that receives a diluent flow from a diluent source and a concentrate pathway that receives a concentrate flow from a concentrate source. The concentrate pathway communicates with the mixing pathway to deliver concentrate therein. The mixing pathway manipulates the diluent flow therein to decrease the pressure thereof, thereby creating a low pressure region at the concentrate pathway that promotes introduction of the concentrate into the diluent for mixing therewith. The nozzle housing receives mixed diluent and concentrate from the mixing pathway and delivers the mixed diluent and concentrate therefrom. If desired, the high diluent to concentrate volumetric ratio post-mix drink dispenser may include a diffuser disposed within the nozzle housing below the mixer. The diffuser reduces the velocity of the mixed diluent and concentrate exiting the mixing pathway prior to delivery of the mixed diluent and concentrate into the nozzle housing.

The mixing pathway in the preferred embodiment is a venturi-shaped mixing pathway. The venturi-shaped mixing pathway includes a diluent inlet segment communicating with a concentrate introduction segment, which, in urn, communicates with a mixing outlet segment. The concentrate pathway communicates with the concentrate introduction segment to deliver concentrate therein. The diluent inlet segment tapers in a decreasing cross-sectional area such that the diluent inlet segment constricts the diluent flow thereby increasing diluent velocity and decreasing diluent pressure. The concentrate introduction segment includes a cross-sectional area greater than the diluent inlet segment such that the concentrate introduction segment relieves the constriction to the diluent flow thereby decreasing diluent pressure and creating a low pressure region in the concentrate introduction segment at the concentrate pathway that promotes introduction of the concentrate into the diluent for mixing therewith. The mixing outlet segment expands in an increasing cross-sectional area away from the concentrate introduction segment, thereby decreasing the velocity of the mixed diluent and concentrate prior to their exit from the mixing outlet segment.

The mixer defines a diluent port communicating with the diluent inlet segment of the venturi-shaped mixing pathway. The diluent port receives a connector therein adapted to couple the diluent port with a diluent source. The mixer further defines a boss surrounding the mixing outlet segment. The boss provides a distinct edge about the mixing outlet segment such that any undispensed diluent and concentrate due to surface tension remains in the mixing outlet segment and does not ooze therefrom.

The concentrate pathway includes a check valve therein located adjacent to the concentrate introduction segment of the venturi-shaped mixing pathway. The check valve ensures concentrate within the concentrate pathway experiences a minimum pressure before the concentrate pathway delivers concentrate into the concentrate introduction segment. The check valve further prevents concentrate from seeping into the concentrate introduction segment after concentrate delivery ceases.

The concentrate pathway in a first embodiment includes a concentrate outlet, a concentrate cavity, and a plug. The concentrate outlet communicates with the concentrate introduction segment of the venturi-shaped mixing pathway. The concentrate cavity communicates with the concentrate outlet, and the check valve inserts into the concentrate cavity adjacent the concentrate outlet. The plug inserts into the concentrate cavity to seal the concentrate cavity. The plug is spaced apart from the check valve to form a segment of the concentrate pathway adjacent the check valve. The mixer defines a concentrate port communicating with the segment of the concentrate pathway such that the concentrate port receives a connector therein adapted to couple the concentrate port with a concentrate source.

The mixer in a first embodiment may further define an alternative concentrate pathway that receives an alternative concentrate flow from an alternative concentrate source. The alternative concentrate pathway communicates with the concentrate introduction segment of the venturi-shaped mixing pathway to deliver alternative concentrate therein. The mixing pathway manipulates the diluent flow therein to decrease the pressure thereof, thereby creating a low pressure region at the alternative concentrate pathway that promotes introduction of the alternative concentrate into the diluent for mixing therewith. The nozzle housing receives mixed diluent and alternative concentrate from the mixing pathway and delivers the mixed diluent and alternative concentrate therefrom.

The alternative concentrate pathway includes a check valve therein located adjacent to the concentrate introduction segment of the venturi-shaped mixing pathway. The check valve ensures alternative concentrate within the alternative concentrate pathway experiences a minimum pressure before the alternative concentrate pathway delivers alternative concentrate into the concentrate introduction segment. The check valve further prevents alternative concentrate from seeping into the concentrate introduction segment after alternative concentrate delivery ceases.

The alternative concentrate pathway includes a concentrate outlet, a concentrate cavity, and a plug. The concentrate outlet communicates with the concentrate introduction segment of the venturi-shaped mixing pathway. The concentrate cavity communicates with the concentrate outlet, and the check valve inserts into the concentrate cavity adjacent the concentrate outlet. The plug inserts into the concentrate cavity to seal the concentrate cavity. The plug is spaced apart from the check valve to form a segment of the alternative concentrate pathway adjacent the check valve. The mixer defines an alternative concentrate port communicating with the segment of the alternative concentrate pathway such that the alternative concentrate port receives a connector therein adapted to couple the alternative concentrate port with an alternative concentrate source.

The mixer may define an additive pathway that receives an additive flow from an additive source. The mixer delivers the additive exterior thereto such that the additive mixes with the mixed diluent and concentrate exiting the mixing pathway.

A product delivery system supports the concentrate source and facilitates delivery of concentrate from the concentrate source to the concentrate pathway. The product delivery system defines an open substantially box-like structure that angles downward to facilitate feeding of concentrate to an exit port of the concentrate source. The product delivery system includes a pump coupled with the concentrate source and the concentrate pathway to pump concentrate from the concentrate source to the concentrate pathway. A voltage applied to the pump controls the pumping of concentrate from the concentrate source to the concentrate pathway. An increase in voltage applied to the pump increases concentrate flow rate to the concentrate pathway, and a decrease in voltage applied to the pump decreases concentrate flow rate to the concentrate pathway. Alternatively, a duty cycle applied to the pump controls the pumping of concentrate from the concentrate source to the concentrate pathway. An increase in duty cycle duration increases concentrate flow rate to the concentrate pathway, and a decrease in duty cycle duration decreases concentrate flow rate to the concentrate pathway.

The high diluent to concentrate volumetric ratio post-mix drink dispenser according to a second embodiment includes a valve body that supports the mixer and a nozzle cover disposed about the nozzle housing and securable with the valve body. The valve body defines a concentrate delivery passageway communicating with the concentrate pathway of the mixer for delivering concentrate thereto and a diluent delivery passageway communicating with the mixing pathway of the mixer for delivering diluent thereto.

The high diluent to concentrate volumetric ratio post-mix drink dispenser according to the second embodiment includes a flow rate controller and a valve seal disposed in the concentrate delivery passageway. The flow rate controller regulates concentrate flow rate to the concentrate pathway of the mixer, whereas the valve seal is user actuated to start and stop concentrate flow rate to the concentrate pathway of the mixer. The flow rate controller disposed in the concentrate delivery passageway may comprise a manually adjustable plug valve with an elongated side port, whereby adjustments in the size of an opening from the elongated side port regulates concentrate flow rate to the concentrate pathway of the mixer. The flow rate controller disposed in the concentrate delivery passageway alternatively may comprise a body molded from a plastics material, an insert machined from a metal, and an adjustment screw machined from a plastics material.

The body includes an inlet section defining an inlet channel interior thereto, an exit section adjacent the inlet section, and an adjustment section adjacent the exit section. The exit section defines an exit channel interior thereto that communicates with the inlet channel and terminates in an exit aperture elongated with a length to width ratio of greater than 4:1 and, preferably, up to a length to width ratio of 8.9:1. The adjustment section defines interior thereto an adjustment cavity communicating with an adjustment channel that communicates with the exit channel. The inlet section and the adjustment section are sized to frictionally engage a flow control chamber of the concentrate delivery passageway, whereas the exit section is sized such that the exit section is spaced apart from the flow control chamber to create an exit chamber in the flow control chamber that communicates with an outlet thereof.

The insert fits within the adjustment section. The insert further defines a passage therethrough. The insert comprises an interior surface including threads having a thread count of greater than 24 threads per 1 inch and, preferably, up to a thread count of 50 threads per 1 inch.

The adjustment screw includes a head disposed within the insert and a shank coupled with the head. The head includes an exterior surface having threads with a thread count of greater than 24 threads per 1 inch and, preferably, up to a thread count of 50 threads per 1 inch whereby the threads of the head are sized to engage the threads of the insert. The shank extends into the exit channel such that movement of the head within the insert concurrrently moves the shank in the exit channel among a closed position that seals the inlet channel to prevent flow into the exit channel and through the exit aperture, intermediate positions that permit partial flow from the inlet section into the exit channel and through the exit aperture, and a fully open position that permits full flow from the inlet section into the exit channel and through the exit aperture.

The exit aperture comprises an elongated slot with a length to width ratio of greater than 4:1, and, preferably, up to a length to width ratio of 8.9:1 in order to necessitate travel of the shank away from the inlet channel a preset minimum before concentrate flow through the exit channel and from the exit aperture achieves a rate sufficient for a precise and final adjustment of flow rate therethrough to a desired concentrate flow rate. The insert and the head of the adjustment screw include a thread count of greater than 24 threads per 1 inch and, preferably, up to a thread count of 50 threads per 1 inch to facilitate precise incremental movements of the shank within the exit channel relative to the inlet channel such that precise incremental adjustments in concentrate flow rates through the flow rate controller are achieved.

The high diluent to concentrate volumetric ratio post-mix drink dispenser according to the second embodiment includes a flow rate controller and a valve seal disposed in the diluent delivery passageway. The flow rate controller regulates diluent flow rate to the mixing pathway of the mixer, whereas the valve seal is user actuated to start and stop diluent flow rate to the mixing pathway of the mixer. The flow rate controller disposed in the diluent delivery passageway comprises a solenoid operated flow rate control valve including a spring-loaded ceramic piston.

The concentrate pathway in the second embodiment includes a concentrate outlet, a concentrate outlet cavity, a concentrate valve cavity, first and second plugs, and a concentrate inlet conduit. The concentrate outlet communicates with the concentrate introduction segment of the venturi-shaped mixing pathway. The concentrate outlet cavity communicates with the concentrate outlet. The first plug inserts into the concentrate outlet cavity to seal the concentrate cavity and create a concentrate outlet conduit communicating with the concentrate outlet. The concentrate valve cavity communicates with the concentrate outlet conduit, and the check valve inserts into the concentrate valve cavity until the check valve abuts a stop of the concentrate valve cavity such that the check valve feeds into a segment of the concentrate valve cavity communicating with the concentrate outlet conduit. The second plug inserts into the concentrate valve cavity to seal the concentrate valve cavity such that the second plug is spaced apart from the check valve to form a segment of the concentrate pathway adjacent the check valve. The concentrate inlet conduit communicates with the segment of the concentrate pathway adjacent the check valve. The mixer defines a concentrate port communicating with the concentrate inlet conduit, whereby the mixer couples with the valve body such that the concentrate delivery passageway communicates with the concentrate port.

A drink dispensing system incorporates therein a high diluent to concentrate volumetric ratio post-mix drink dispenser. The drink dispensing system includes a housing and a control system disposed in the housing. A diluent source coupled with the housing delivers diluent thereto. A product delivery system supports a concentrate source, and a pump of the product delivery system delivers concentrate from the concentrate source to the housing. The control system operatively connects with the pump in order to control the pump and thus regulate concentrate flow rate during the pumping of concentrate from the concentrate source to the housing. The high diluent to concentrate volumetric ratio post-mix drink dispenser is disposed on the housing such that the housing delivers diluent and concentrate to the high diluent to concentrate volumetric ratio post-mix drink dispenser. In particular, the pump of the product delivery system pumps concentrate from the concentrate source through the housing and to the concentrate pathway of the high diluent to concentrate volumetric ratio post-mix drink dispenser. The diluent source delivers diluent through the housing and to the mixing pathway of the high diluent to concentrate volumetric ratio post-mix drink dispenser. The concentrate pathway communicates with the mixing pathway to deliver concentrate therein while the mixing pathway manipulates the diluent flow therein to decrease the pressure thereof, thereby creating a low pressure region at the concentrate pathway that promotes introduction of the concentrate into the diluent for mixing therewith prior to delivery of the mixed diluent and concentrate from the high diluent to concentrate volumetric ratio post-mix drink dispenser.

The control system controls the pump to regulate concentrate flow rate during the pumping of concentrate from the concentrate source to the housing. The control system varies a voltage applied to the pump, whereby a voltage increase increases concentrate flow rate to the concentrate pathway and a voltage decrease decreases concentrate flow rate to the concentrate pathway. Alternatively, the control system controls the pump to regulate concentrate flow rate during the pumping of concentrate from the concentrate source to the housing. The control system varies a duty cycle applied to the pump, whereby an increase in duty cycle duration increases concentrate flow rate to the concentrate pathway and a decrease in duty cycle duration decreases concentrate flow rate to the concentrate pathway.

A method of dispensing a high diluent to concentrate volumetric ratio post-mix drink includes the following steps. A diluent source delivers a diluent to a mixing pathway of a high diluent to concentrate volumetric ratio post-mix drink dispenser. A concentrate source delivers a concentrate to a concentrate pathway of the high diluent to cone volumetric ratio post-mix drink dispenser. The concentrate pathway communicates the concentrate into the mixing pathway. The mixing pathway manipulates a diluent flow therethrough to decrease the pressure thereof, thereby creating a low pressure region at the concentrate pathway that promotes introduction of the concentrate into the diluent for mixing therewith. The mixing pathway delivers the mixed diluent and concentrate from the high diluent to concentrate volumetric ratio post-mix drink dispenser. The method of dispensing a high diluent to concentrate volumetric ratio post-mix drink further includes reducing the velocity of the mixed diluent and concentrate exiting the mixing pathway prior to delivery of the mixed diluent and concentrate from the high diluent to concentrate volumetric ratio post-mix drink dispenser.

Manipulating a diluent flow through the mixing pathway includes flowing the diluent through a diluent inlet segment, a concentrate introduction segment, and a mixing outlet segment. The diluent inlet segment tapers in a decreasing cross-sectional area such that the diluent inlet segment constricts the diluent flow thereby increasing diluent velocity and decreasing diluent pressure. The concentrate introduction segment includes a cross-sectional area greater than the diluent inlet segment such that the concentrate introduction segment relieves the constriction to the diluent flow thereby decreasing diluent pressure and creating a low pressure region in the concentrate introduction segment at the concentrate pathway that promotes introduction of the concentrate into the diluent for mixing therewith. The mixing outlet segment expands in an increasing cross-sectional area away from the concentrate introduction segment, thereby decreasing the velocity of the mixed diluent and concentrate prior to their exit from the mixing outlet segment.

Delivering a concentrate includes flowing the concentrate to the mixing pathway only after the concentrate reaches a minimum pressure. Delivering a concentrate further includes ceasing concentrate flow to the mixing pathway when concentrate pressure drops below the minimum pressure.

Delivering a diluent to a mixing pathway and a concentrate to a concentrate pathway includes measuring diluent flow rate, determining a desired diluent flow rate and a desired concentrate flow rate that produces a correct high diluent to concentrate volumetric flow rate ratio, adjusting diluent flow rate to the desired diluent flow rate, and adjusting concentrate flow rate to the desired concentrate flow rate. Adjusting concentrate flow rate to the desired concentrate flow rate includes adjusting a voltage applied to a pump that pumps concentrate to the concentrate pathway, whereby a voltage increase increases concentrate flow rate to the concentrate pathway and a voltage decrease decreases concentrate flow rate to the concentrate pathway. Alternatively, adjusting concentrate flow rate to the desired concentrate flow rate includes adjusting a duty cycle applied to a pump that pumps concentrate to the concentrate pathway, whereby an increase in duty cycle duration increases concentrate flow rate to the concentrate pathway and a decrease in duty cycle duration decreases concentrate flow rate to the concentrate pathway.

BRIEF DESCRIPTION OF DRAWINGS

FIG. 21 is a top plan view illustrating the mixer of the post-mix drink dispenser according to the second embodiment.

FIG. 22 is a cross-sectional elevation view taken along lines A-A of FIG. 21 illustrating the mixer of the post-mix drink dispenser according to the second embodiment.

FIG. 23 is a cross-sectional elevation view taken along lines B-B of FIG. 21 illustrating the mixer of the post-mix drink dispenser according to the second embodiment.

FIG. 24 is a cross-sectional elevation view taken along lines C-C of FIG. 21 illustrating the mixer of post-mix drink dispenser according to the second embodiment.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
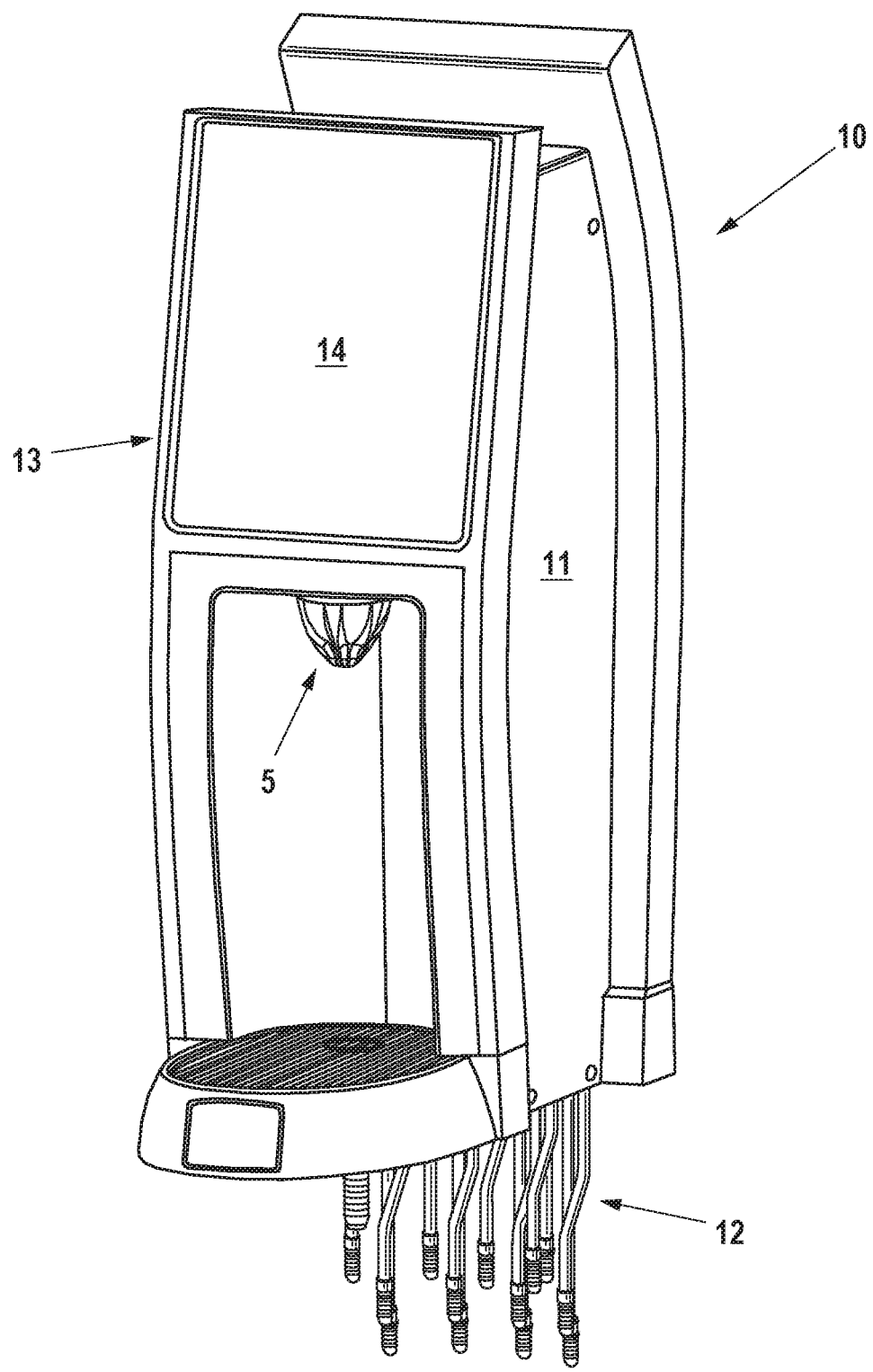
FIG. 1 is an isometric view illustrating a high diluent to concentrate volumetric ratio post-mix drink dispenser according to a first embodiment incorporated into an example drink dispensing system.
Figure 2:
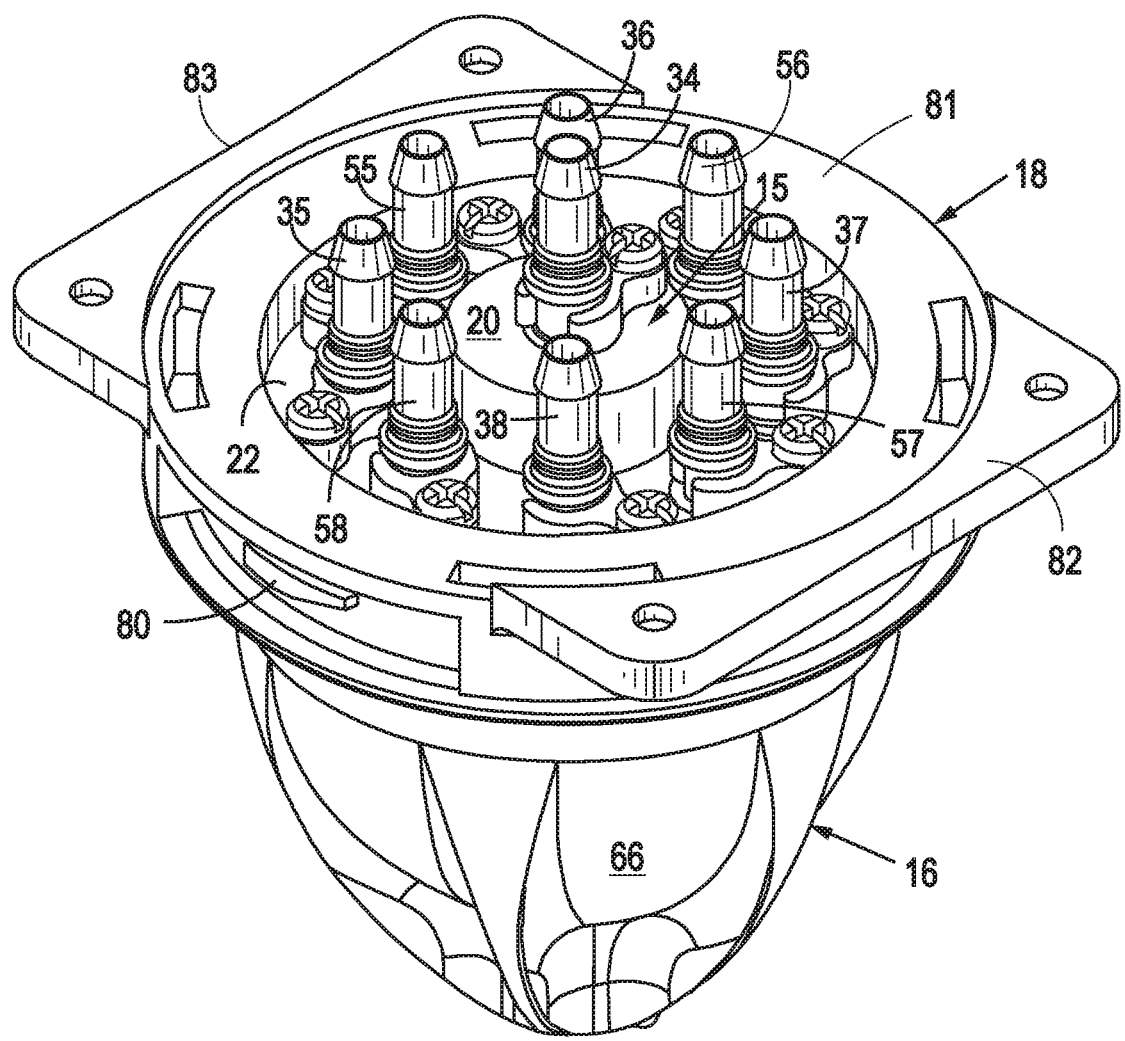
FIG. 2 is a top isometric view illustrating the post-mix drink dispenser according to the first embodiment.
Figure 3:
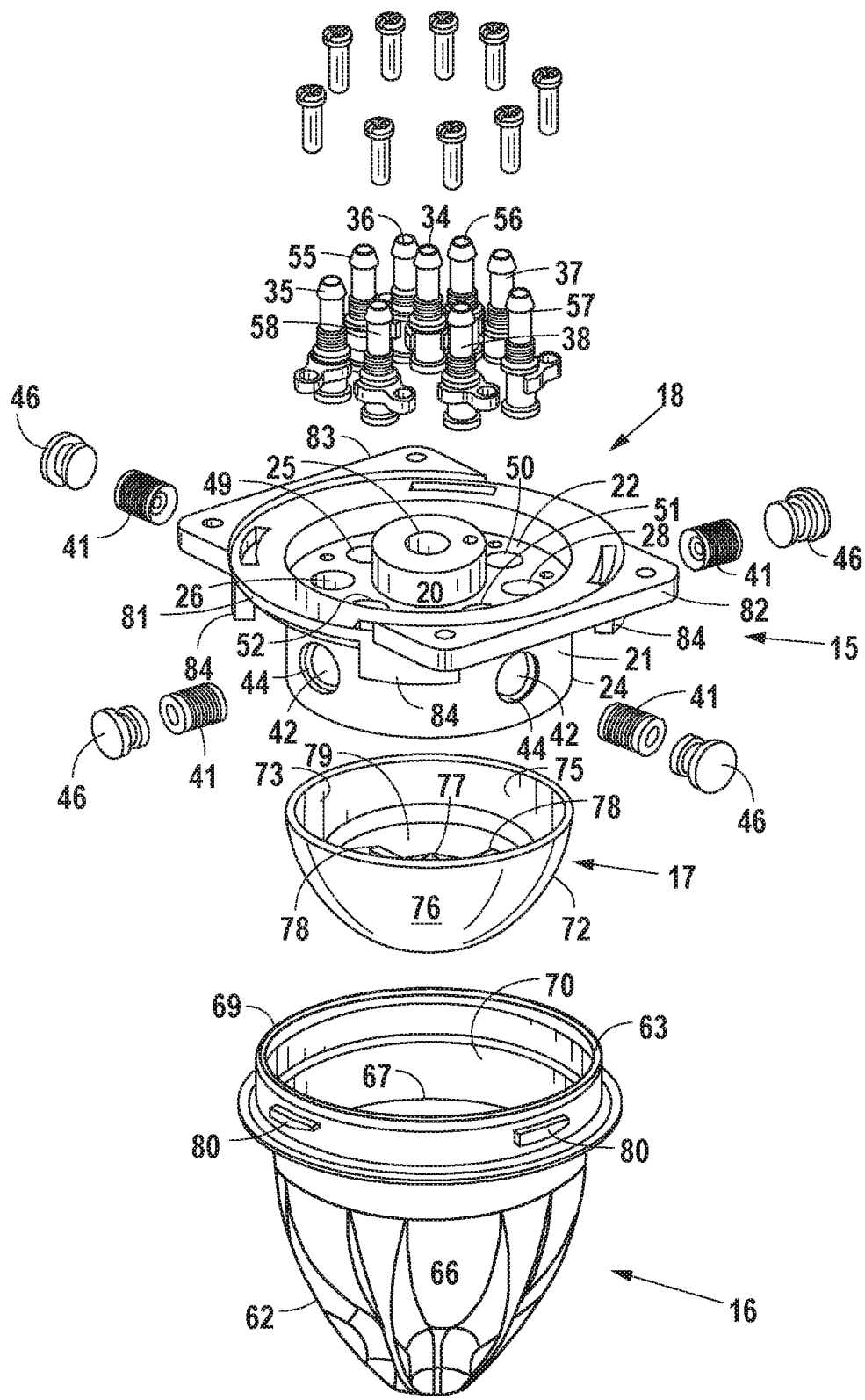
FIG. 3 is an exploded top isometric view illustrating the post-mix drink dispenser according to the first embodiment.
Figure 4:
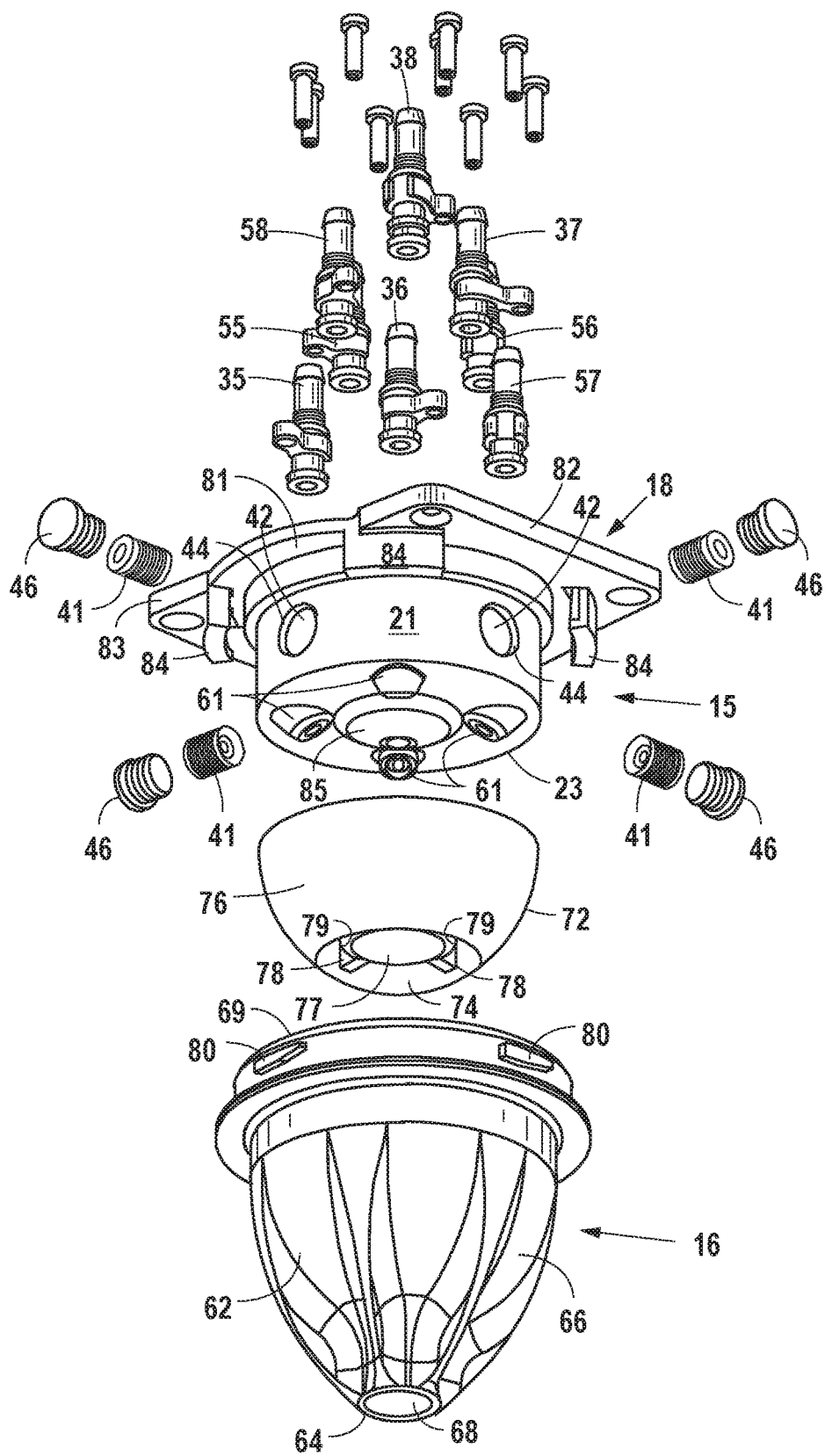
FIG. 4 is an exploded bottom isometric view illustrating the post-mix drink dispenser according to the first embodiment.
Figure 5:
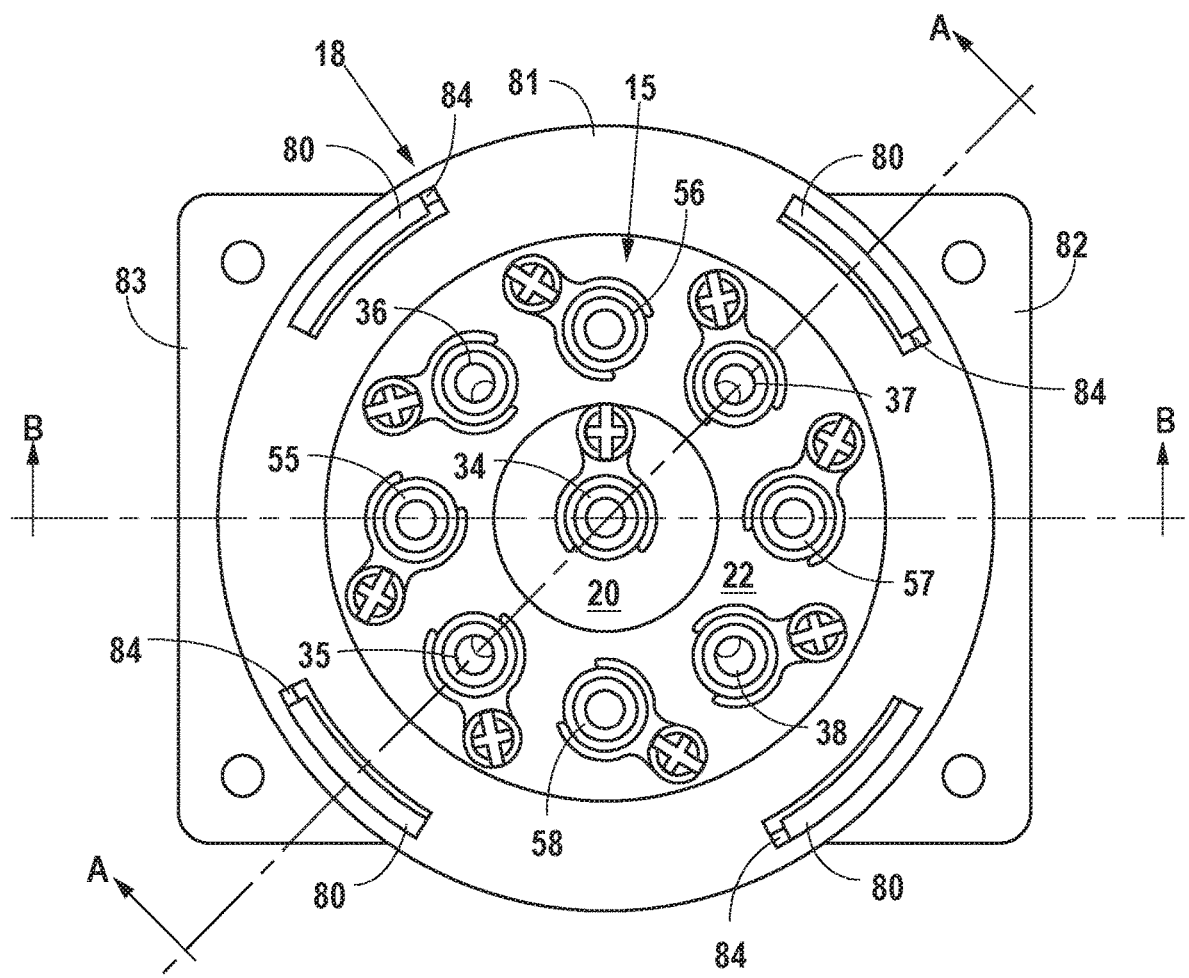
FIG. 5 is a top plan view illustrating the post-mix drink dispenser according to the first embodiment.
Figure 6:
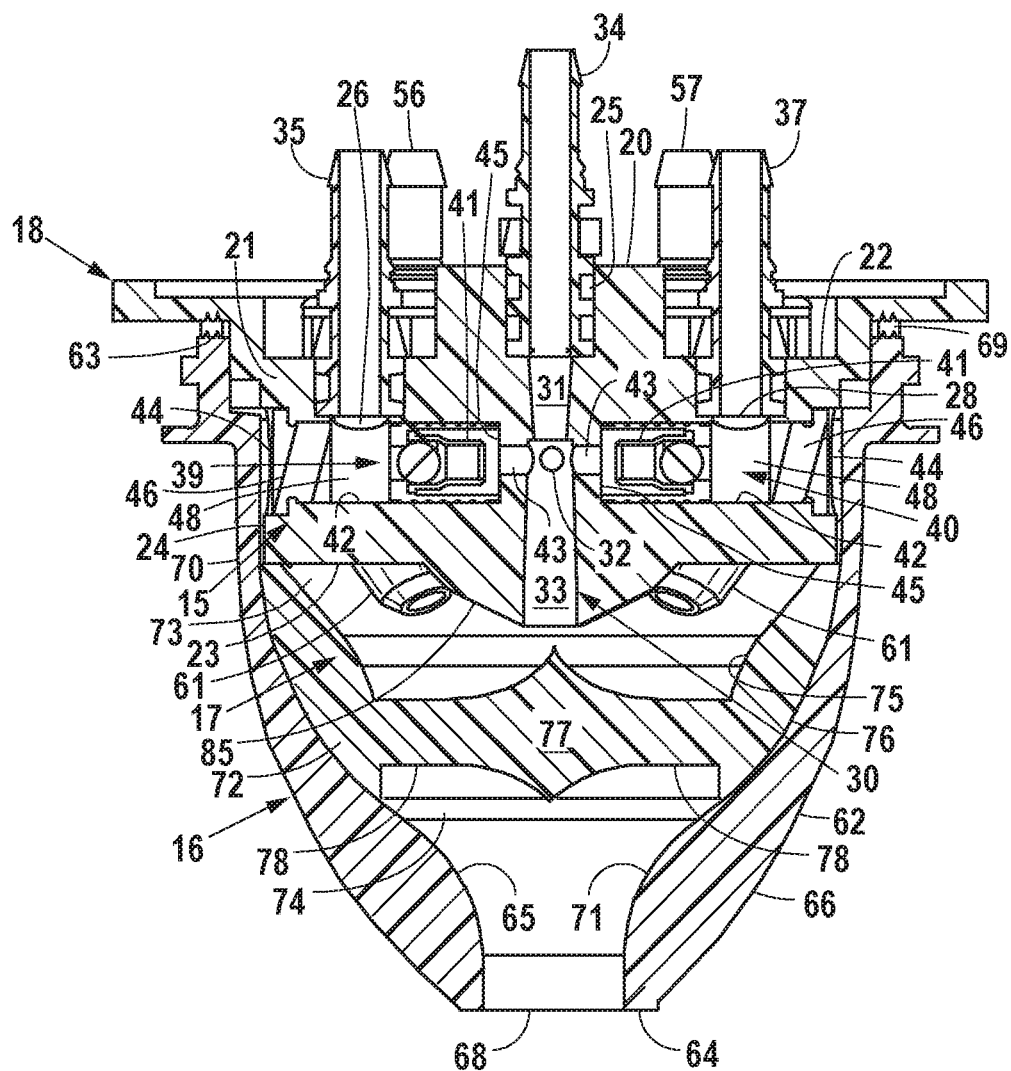
FIG. 6 is cross-sectional elevation view taken along lines A-A of FIG. 5 illustrating the post-mix drink dispenser according to the first embodiment.
Figure 7:
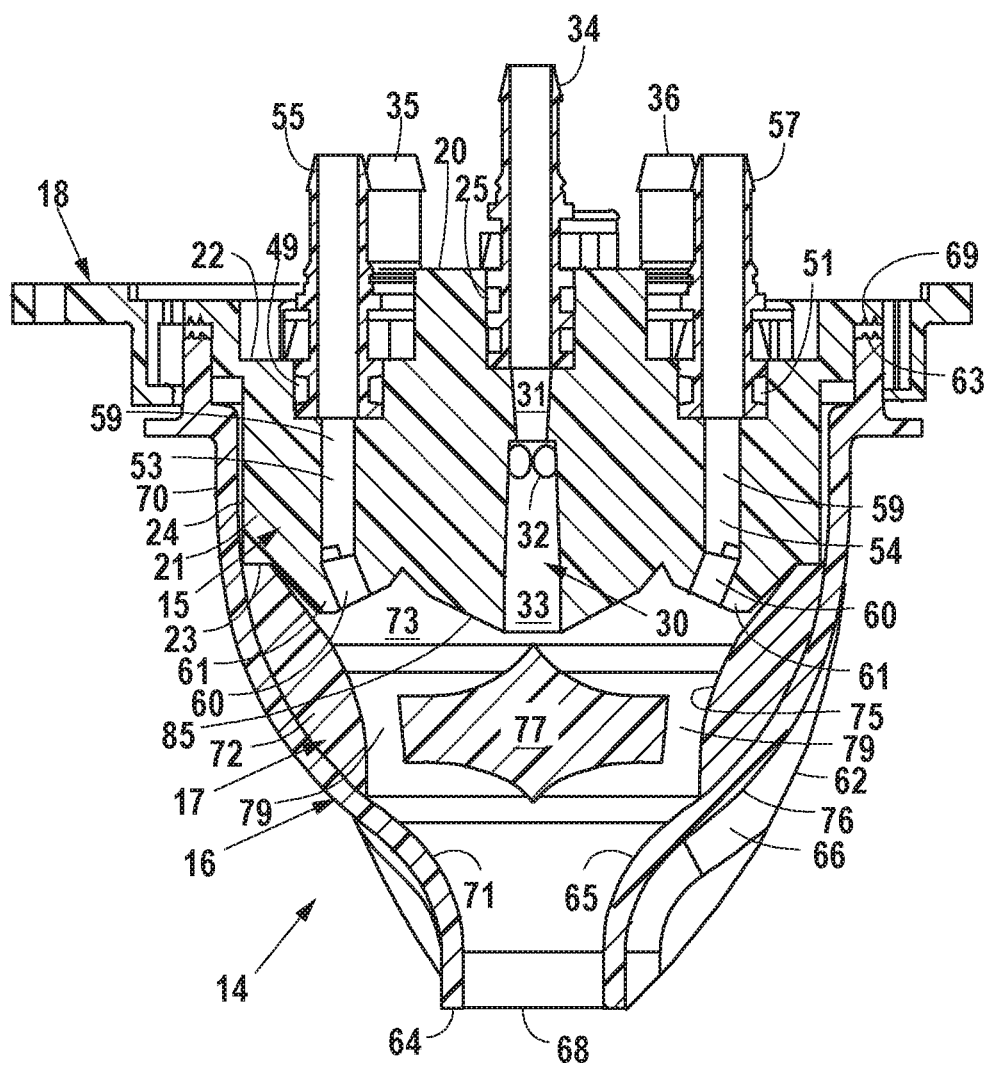
FIG. 7 is cross-sectional elevation view taken along lines B-B of FIG. 5 illustrating the post-mix drink dispenser according to the first embodiment.

FIG. 1 illustrates a high diluent to concentrate volumetric ratio post-mix drink dispenser 5 according to a first embodiment of the present invention incorporated into an example drink dispensing system 10. Once incorporated into the drink dispensing system 10, the post-mix drink dispenser 5 provides the drink dispensing system 10 with the capability to dispense high diluent to concentrate volumetric ratio post-mix drinks. In the first embodiment, the post-mix drink dispenser 5 delivers a diluent, such as plain or carbonated water, for mixing with one or more of four viscous concentrates, such as juices (e.g., coconut, acai, mango, papaya), coffee, tea, sweeteners (e.g., cane sugar), and the like. The post-mix drink dispenser 5 further delivers up to four flavor additives for mixing with the diluent and the one or more of four concentrates. While the first embodiment of the post-mix drink dispenser 5 dispenses four concentrates and flavor additives, one of ordinary skill in the art will recognize that no flavor additives are necessary and further only a single concentrate is required. Consequently, the post-mix drink dispenser 5 may include any number of concentrates and flavor additives based upon the dispensing requirements of the drink dispensing system 10. Moreover, multiple diluents of different types may be supplied to the post-mix drink dispenser 5 for combining with the concentrates.

Referring to FIGS. 2-7, the post-mix drink dispenser 5 includes a mixer 15, a nozzle housing 16, and optionally a diffuser 17. The mixer 15 includes formed integrally therewith mounting member 18 that secures the nozzle housing 16 with the mixer and the mixer 15 with the drink dispensing system 10 using any suitable means such as screws to mount the post-mix drink dispenser 5 to the drink dispensing system 10. Although the mounting member 18 is formed integrally with the mixer 15, one of ordinary skill in the art will recognize that the mounting member 18 may be a separate part secured h the mixer 15 using any suitable means such as screws.

The mixer includes a body 21 having in the first embodiment a cylindrical shape with an inlet surface 22 and an outlet surface 23 between a side surface 24. The mixer 15 defines a venturi-shaped mixing pathway 30. The venturi-shaped mixing pathway 30 includes a diluent inlet segment 31 communicating with a concentrate introduction segment 32, which, in turn, communicates with a mixing outlet segment 33. The diluent inlet segment 31 tapers in a decreasing cross-sectional area in order to provide a constriction to the flow of diluent through the venturi-shaped mixing pathway 30 that increases diluent velocity while also decreasing diluent pressure. The diluent inlet segment 31 delivers the diluent into the concentrate introduction segment 32, which, accordingly, has a cross-sectional area greater than the diluent inlet segment 31. The greater cross-sectional area of the concentrate introduction segment 32 relative to the diluent inlet segment 31 relieves the constriction to the flow of diluent in the venturi-shaped mixing pathway 30 through a sudden expansion that results in a further decrease in diluent pressure. The pressure decrease creates a low pressure region in the concentrate introduction segment 32 at the point of concentrate delivery into the venturi-shaped mixing pathway 30 that promotes introduction of the concentrate into the diluent for mixing therewith. The concentrate introduction segment 32 delivers the mixed diluent and concentrate into the mixing outlet segment 33, which expands in an increasing cross-sectional area away from the concentrate introduction segment 32, thereby decreasing the velocity of the mixed diluent and concentrate prior to their exit from the venturi-shaped mixing pathway 30.

The mixer 15 at the inlet surface 22 includes a boss 20 defining a diluent port 25 that communicates with the venturi-shaped mixing pathway 30 at the diluent inlet segment 31. The diluent port 25 receives therein a connector 34 that couples the post-mix drink dispenser 5 with a product line that delivers diluent from a diluent source. The connector 34 secures with the mixer 15 using any suitable means such as a bracket and screw.

The mixer 15 at the inlet surface 22 includes a concentrate port 26 that communicates with a concentrate pathway 39 defined by the mixer 15. The mixer 15 at the inlet surface 22 includes a concentrate port 28 that communicates with a concentrate pathway 40 defined by the mixer 15. The mixer 15 at the inlet surface 22 includes concentrate ports 27 and 29 that each communicate with a separate concentrate pathway defined by the mixer 15. The concentrate ports 26-29 each receive therein respectively one of connectors 35-38 that couples the post-mix drink dispenser 5 with a respective product line that delivers a concentrate from a concentrate source. The connectors 35-38 each secure with the mixer 15 using any suitable means such as a bracket and screw.

The concentrate pathway 39 will be described herein in detail to provide an example of the concentrate pathways defined by the mixer 15. Although only the concentrate pathway 39 is described, it should be understood by one of ordinary skill in the art that the remaining concentrate pathways are identical in design, configuration, and function and further that like parts have been labeled with like numbers.

The concentrate pathway 39 communicates with the concentrate introduction segment 32 of the venturi-shaped mixing pathway 30 to deliver concentrate therein. The concentrate pathway 39 includes a check valve 41 therein located adjacent to the concentrate introduction segment 32. The check valve 41 ensures the viscous concentrate within the concentrate pathway 39 experiences a minimum pressure before the concentrate pathway 39 delivers the concentrate into the concentrate introduction segment 32. The minimum pressure necessary before the check valve 41 allows the viscous concentrate to flow through the concentrate pathway 39 produces a uniform, stable, and consistent flow of viscous concentrate into the concentrate introduction segment 32.

Moreover, the check valve 41 due to its location near the concentrate introduction segment 32 prevents the viscous concentrate from seeping into the venturi-shaped mixing pathway 30 after concentrate delivery ceases. Viscous concentrates due to their thick consistencies tend to ooze along a path when not restrained. Upon cessation of concentrate delivery, the pressure of the concentrate within the concentrate pathway 39 rapidly diminishes below the minimum operating pressure of the check valve 41, resulting in the prompt closing of check valve 41. The minimum operating pressure of the check valve 41 exceeds any pressure exerted by the stopped viscous concentrate, thereby preventing concentrate from seeping into the venturi-shaped mixing pathway 30. The positioning of the check valve 41 adjacent the concentrate introduction segment 32 minimizes any length of the concentrate pathway 39 subsequent to the check valve 41 such that, once concentrate flow stops, the diluent flowing through the venturi-shaped mixing pathway 30 contacts and removes the concentrate from the concentrate pathway 39 located at the concentrate introduction segment 32, particularly, if the flow of diluent continues briefly after the flow of concentrate ceases.

Although the venturi-shaped mixing pathway 30 is designed to remove the concentrate from the concentrate pathway 39 and deliver the mixed diluent and concentrate from its mixing outlet segment 33, the mixer 15 in the event diluent and concentrate remains after a dispense defines a boss 85 at the outlet surface 23 to prevent undispensed diluent and concentrate from migrating out of the mixing outlet segment 33. The boss 85 protrudes from the body 21 to surround the mixing outlet segment 33 and provide a distinct edge thereabout such that any undispensed diluent and concentrate due to surface tension stays in the mixing outlet segment 33 and does not ooze therefrom.

The mixer 15 defines a concentrate cavity 42 communicating with a concentrate outlet 43, which, in turn communicates with the concentrate introduction segment 32 of the venturi-shaped mixing pathway 30. The check valve 41 inserts into the concentrate cavity 42 at an aperture 44 of the concentrate cavity 42 until the check valve 41 abuts the end 45 of the concentrate cavity 42 next to the concentrate outlet 43. A plug 46 inserts into the concentrate cavity 42 at the aperture 44 to seal the concentrate cavity 42. The plug 46 is sized to fluidly seal the concentrate cavity 42 while remaining spaced apart from the check valve 41 sufficiently to form a segment 48 of the concentrate pathway 39 into which the concentrate port 26 communicates. In the first embodiment, the concentrate pathway 39 accordingly includes the segment 48, the check valve 41, and the concentrate outlet 43, and concentrate entering the connector 35 via a product line flows from the connector 35 through the segment 48, the check valve 41, and the concentrate outlet 43 prior to entering the venturi-shaped mixing pathway 30 at the concentrate introduction segment 32. While the check valve 41 may be any check valve suitable to operate with viscous concentrates, the check valve 41 in the first embodiment may be an 855 Series Press-In check valve available from The Lee Company, 2 Pettipaug Road, Westbrook, Conn. 06498-0424.

The mixer 15 at the inlet surface 22 includes an additive port 49 that communicates with an additive pathway 53 defined by the mixer 15. The mixer 15 at the inlet surface 22 includes an additive port 51 that communicates with an additive pathway 54 defined by the mixer 15. The mixer 15 at the inlet surface 22 includes additive ports 50 and 52 that each communicate with a separate additive pathway defined by the mixer 15. The additive ports 49-52 each receive therein respectively one of connectors 55-58 that couples the post-mix drink dispenser 5 with a respective product line that delivers a flavor additive from an additive source. The connectors 55-58 each secure with the mixer 15 using any suitable means such as a bracket and screw.

The additive pathway 53 will be described herein in detail to provide an example of the concentrate pathways defined by the mixer 15. Although only the additive pathway 53 is described, it should be understood by one of ordinary skill in the art that the remaining concentrate pathways are identical in design, configuration, and function and further that like parts have been labeled with like numbers. The additive pathway 53 includes a conduit 59 communicating with a nozzle outlet 60 at a nozzle 61 defined by the mixer 15 at the outlet surface 23. Although the first embodiment discloses the nozzles 61 formed integrally with the mixer 15 at the outlet surface 23, one of ordinary skill in the art will recognize that the nozzles 61 may be formed as a separate part connected with the mixer 15.

The nozzle housing 16 in the first embodiment includes a body 62 having an inlet surface 63 defining an inlet 67, an outlet surface 64 defining an outlet 68, an inner surface 65, and an outer surface 66. The body 62 on the outer surface 64 below the inlet surface 63 includes tabs 80 that facilitate attachment of the nozzle housing 16 with the mounting member 18. In the first embodiment, there are four tabs 80 formed integrally with the body 62 and spaced equidistant thereabout. The inlet surface 63 includes a seal 69 that fluidly seals the nozzle housing 16 against the mounting member 18. The body 62 along an upper segment 70 thereof has a diameter at the inner surface 65 sized to receive the mixer 15 therein. The body 62 along a lower segment 71 thereof tapers along the inner surface 65 in a decreasing cross-sectional area to outlet 68. The body 62 includes the decreasing cross-sectional area along the lower segment 71 to provide an abutting engagement of the body 62 with the diffuser 17 that maintains the diffuser positioned within the nozzle housing 16 below the mixer 15. Moreover, the decreasing cross-sectional area of the body 62 along the lower segment 71 defines the outlet 68 such that the outlet 68 directs mixed diluent and concentrate and also a flavor additive if selected to a container disposed under the post-mix drink dispenser 5.

The diffuser 17 includes a body 72 having in the first embodiment a conical shape with an inlet 73, an outlet 74, an inner surface 75, and an outer surface 76. The diffuser 17 further includes disposed within the body 72 a plate 77 having a raised portion. The plate 77 secures with the inner surface 75 by arms 78 that define channels 79 between the inner surface 75 and the plate 77. In the first embodiment, there are four arms 78 formed integrally with the body 72 and the plate 77 such that there are four channels 79 that communicate with the outlet 74. The body 72 along its outer surface 76 tapers in a decreasing cross-sectional area such that the body 72 fits in abutting relationship with the inner surface 65 of the nozzle housing 16. The body 72 along its inner surface 75 tapers in a decreasing cross-sectional such that the channels 79 and the outlet 74 of the diffuser 17 direct mixed diluent and concentrate and additive if necessary to the outlet 68 of the nozzle housing 16.

The post-mix drink dispenser 5 includes the diffuser 17 to reduce the velocity of the mixed diluent and concentrate exiting the venturi-shaped mixing pathway 30. In particular, the plate 77 of the diffuser 17 receives the exiting mixed diluent and concentrate thereon and spreads the exiting mixed diluent and concentrate along its surface. The spreading of the mixed diluent and concentrate along the plate 77 increases the surface area of the flowing mixed diluent and concentrate, thereby producing a corresponding reduction in their velocity. The diffuser 17 accordingly facilitates a uniform, stable, and consistent flow of mixed diluent and concentrate through the post-mix drink dispenser 5 due to its reduction in their velocity prior to their exit from the outlet 68 of the nozzle housing 16. It should be understood by one of ordinary skill in the art that, although the diffuser 17 enhances the delivery of diluent and concentrate from the post-mix drink dispenser 5, the post-mix drink dispenser 5 will operate satisfactorily if the diffuser 17 is omitted.

The mounting member 18 includes a platform 81 formed integrally with brackets 82 and 83. The brackets 82 and 83 secure the post-mix drink dispenser 5 with the drink dispensing system 10 using any suitable means such as screws. The platform 81 includes supports 84 that define slots for receiving the tabs 80 of the nozzle housing 16 therein such that a respective tab 80 engages a respective support 84 to secure the nozzle housing 16 with the mixer 15. Although the platform 81 is formed integrally with brackets 82 and 83, one of ordinary skill in the art will recognize that the platform 81 and the brackets 83 and 83 may be separate parts secured together using any suitable means such as screws.

Incorporation of the post-mix drink dispenser 5 into the drink dispensing system 10 as illustrated in FIG. 1 begins with the assembly of the post-mix drink dispenser 5. The connector 34 inserts into the diluent port 25 of the mixer 15 and is secured thereto. The connectors 35-38 each insert into a respective concentrate port 26-29 of the mixer 15 and are secured thereto. The connectors 55-58 each insert into the additive ports 49-52 of the mixer 15 and are secured thereto. The diffuser 17 inserts through the inlet 67 of the nozzle housing 16 until the diffuser 17 abuts the inner surface 65 of the nozzle housing 16 and is located above the outlet 68 of the nozzle housing 16. The mixer 15 inserts through the inlet 67 of the nozzle housing 16 until the seal 69 of the inlet surface 63 for the nozzle housing 16 seats against the mounting member 18, thereby positioning the venturi-shaped mixing pathway 30 above the plate 77 of the diffuser 17. The tabs 80 of the nozzle housing 16 reside adjacent the supports 84 for the platform 81 of the mounting member 18 whereby rotation of the nozzle housing 16 places the tabs 80 into the slots of the supports 84 in order to couple the nozzle housing 16 with the mounting member 18. After assembly of the post-mix drink dispenser 5, the mounting member 18 secures the post-mix drink dispenser 5 with the drink dispensing system 10 using the brackets 82 and 83 of the mounting member 18 and any suitable means such as screws.

The drink dispensing system 10 includes a housing 11, which may be a tower securable to a suitable support platform such as a countertop or bin including a cold plate or refrigeration unit. The housing 11 includes product lines 12 that deliver diluent, concentrate, and flavor additives to the post-mix drink dispenser 5. One of the product lines 12 is a diluent line that connects with a diluent source, such as a pressurized carbonated water system or a pressurized plain water system, either directly or through a cooling system such as a cold plate when cooled diluent is desired. Four product lines 12 in the first embodiment are concentrate lines that each connect with a concentrate source, such as a bag in a box (BIB), either directly or through a cooling system such as a remote chiller when cooled concentrate is desired. Four product lines 12 in the first embodiment are additive lines that each connect with an additive source, such as a bag in a box (BIB), either directly or through a cooling system such as a remote chiller when cooled additive is desired.

The drink dispensing system 10 in the first embodiment may include a back block that connects at an inlet with the diluent line of the product lines 12 and at an outlet with a flow rate controller, which may be any suitable flow rate controller such as a solenoid operated flow rate control valve including a spring-loaded ceramic piston well known to one of ordinary skill in the art. The flow rate controller connects with the connector 34 of the post-mix drink dispenser 5 using any suitable means such as flexible tubing to deliver diluent to the post-mix drink dispenser 5 at a desired flow rate.

Each concentrate line of the product lines 12 connects with a respective connector 35-38 of the post-mix drink dispenser 5 using any suitable means such as flexible tubing to deliver concentrate to the post-mix drink dispenser 5. Likewise, each additive line of the product lines 12 connects with a respective connector 55-58 of the post-mix drink dispenser 5 using any suitable means such as flexible tubing to deliver additive to the post-mix drink dispenser 5.

Figure 8:
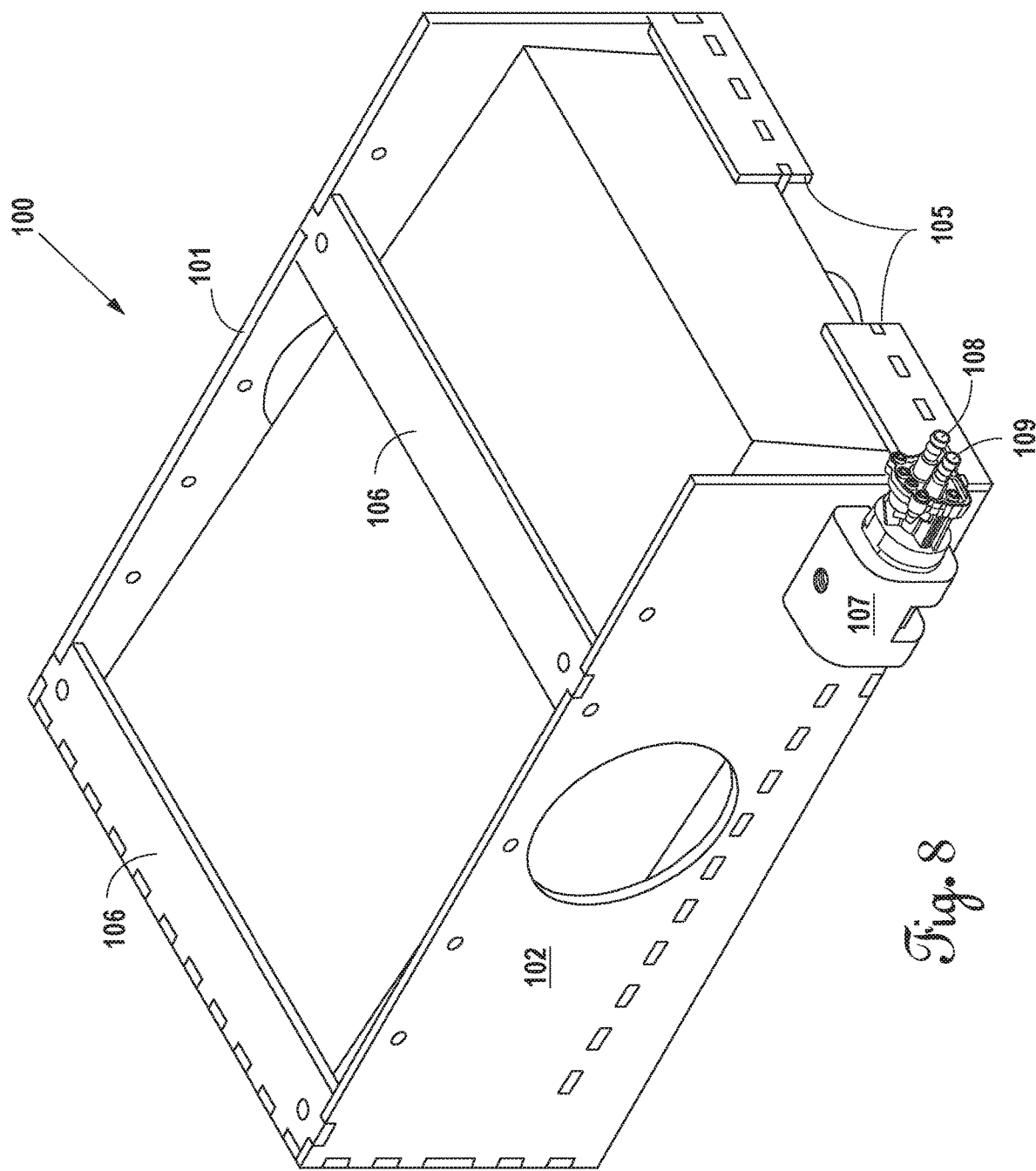
FIG. 8 is a top isometric view illustrating a device for delivering concentrates and a diluent to the post-mix drink dispenser according to the first embodiment.
Figure 9:
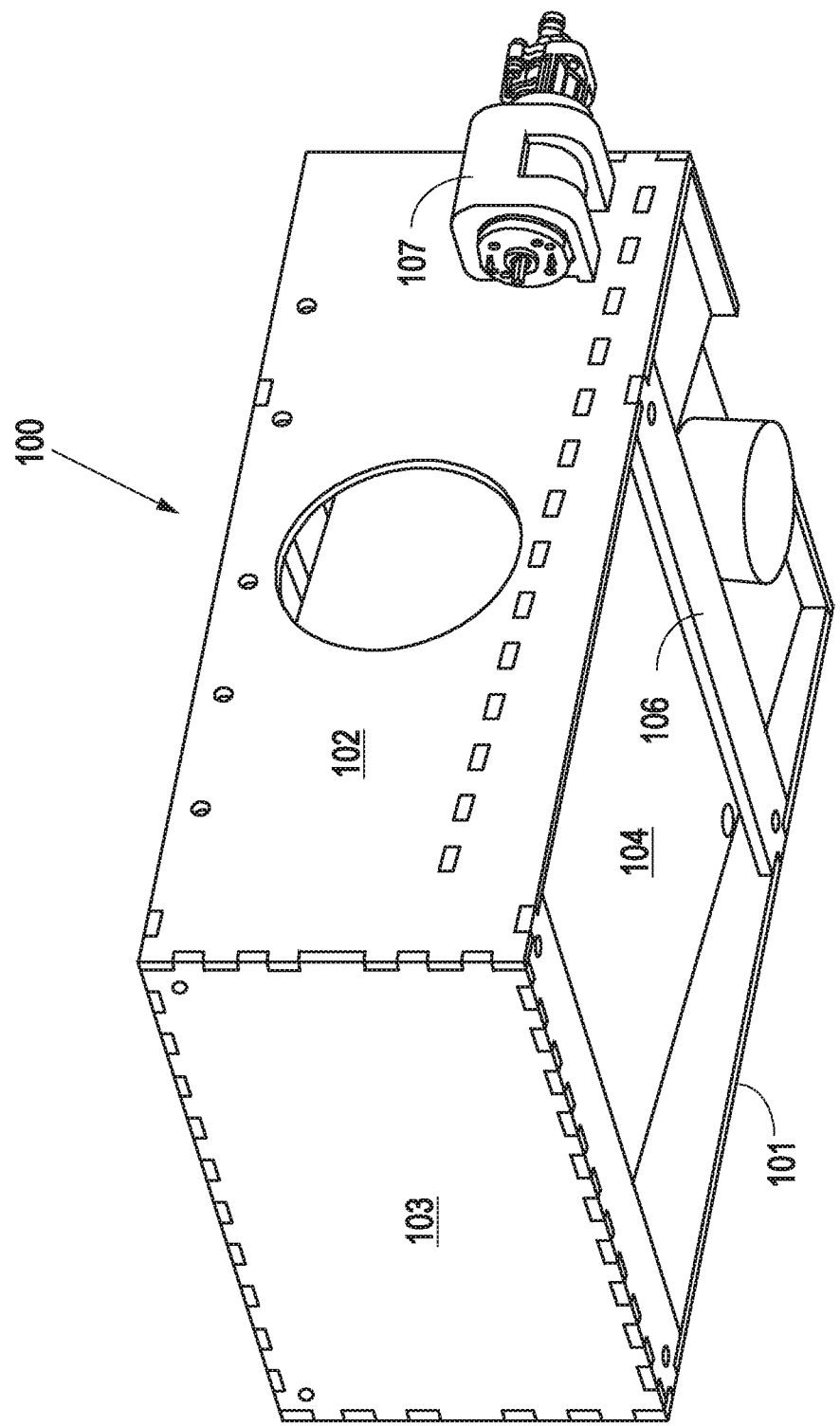
FIG. 9 is a top isometric view illustrating a device for delivering concentrates and a diluent to the post-mix drink dispenser according to the first embodiment.

In the first embodiment of the present invention, the post-mix drink dispenser 5 receives via the concentrate lines and the additive lines concentrates and additives from BIB's that are each supported on a product delivery system 100, an example of which is illustrated in FIGS. 8 and 9. The product delivery system 100 defines an open substantially box-like structure including sides 101 and 102, an end 103, a bottom 104, a stop 105, and braces 106. The sides 101 and 102, the end 103, and the bottom 104 define the open substantially box-like structure of the product delivery system 100 into which a BIB fits. The bottom 104 angles downward from the end 103 to the stop 105 in order to facilitate feeding of concentrate/additive to an exit port of the BIB. The stop 105 maintains the BIB within the product delivery system 100. The braces 106 secure between the sides 101 and 102 to laterally stabilize the product delivery system 100. The sides 101 and 102, end 103, bottom 104, stop 105, and braces 106 of the product delivery system 100 in the first embodiment are constructed from any suitable material such as metal or plastic fitted together using well known means such as spot welding, sonic welding, adhesives, or the like. Each product delivery system 100 in the first embodiment is configured to stack on another product delivery system 100 or receive another product delivery system 100 thereon such that the space required by the product delivery systems 100 is minimized.

The product delivery system 100 in the first embodiment includes a pump 107 to deliver concentrate/additive from a BIB to the post-mix drink dispenser 5. The pump 107 includes an inlet 108 coupled with the exit port of the BIB and an outlet 109 coupled with one of the concentrate lines or additive lines of the product lines 12 for the drink dispensing system 10 to deliver concentrate/additive thereto. While the pump 107 may be any electrical pump suitable to pump viscous concentrates, the pump 107 in the first embodiment may be an electric gear pump available from Fluid-o-Tech, Via Leonardo da Vinci 40, 20094 Corsico, Milan, Italy. The pump 107 in the first embodiment is powered and controlled electrically in order to deliver concentrate/additive at a desired flow rate that ensures a proper tasting drink. A proper tasting drink requires a correct volumetric ratio of diluent to concentrate and additive if necessary, and this is achieved through maintaining a desired flow rate ratio between the diluent and concentrate (e.g., 24 to 1) and additive if necessary. Voltage or duty cycle applied to the pump 107 determines the flow rate of the concentrate/additive to the post-mix drink dispenser 5 with increased voltage or duty cycle duration increasing the flow rate of the concentrate/additive and decreased voltage or duty cycle duration decreasing the flow rate of the concentrate/additive. Although the drink dispensing system 10 in the first embodiment includes a suitable flow rate controller such as a solenoid operated flow rate control valve, one of ordinary skill in the art will recognize that a pump 107 may deliver diluent to the diluent line of the product lines 12, which connects directly with the connector 34 of the post-mix drink dispenser 5.

The drink dispensing system 10 in the first embodiment includes a control system 13 having a user input 14, which is a touch screen in the first embodiment, to receive user drink choice selections and allow a technician to configure the drink dispensing system 10. The control system 13 electrically connects and communicates with the pumps 107 and the diluent flow rate controller to control the delivery of a drink from the post-mix drink dispenser 5. The control system 13 may be any microcontroller, CPU, microprocessor, and the like suitable to control the drink dispensing system 10. The user input 14 presents drink choices including additive choices to a user. A user touches the user input 14 at choice icons to select a concentrate and any additives. The control system 13 receives the user choices and activates the diluent flow rate controller and the pump 107 corresponding with the selected concentrate and any pumps 107 associated with selected additives such that diluent and concentrate and any additives are delivered from the post-mix drink dispenser 5. The control system 13 maintains the diluent flow rate controller and the pumps 107 activated until the end of a dispense which may be either timed or upon the user breaking contact with the user input 14.

The operation of the post-mix drink dispenser 5 in delivering a drink will be described herein with reference to e concentrate pathway 39, the additive pathway 53, and the venturi-shaped mixing pathway 30 to provide an example thereof. Although only the concentrate pathway 39 and the additive pathway 53 are described, it should be understood by one of ordinary skill in the art that the remaining concentrate and additive pathways are identical in design, configuration, and function.

A concentrate containing BIB fits within a product delivery system 100 and connects with the pump 107 thereof. The pump 107 connects with the concentrate line of the product lines 12 communicating with the connector 35, which, in turn, communicates with the concentrate pathway 39. Similarly, an additive containing BIB fits within a product delivery system 100 and connects with the pump 107 thereof. The pump 107 connects with the additive line of the product lines 12 communicating with the connector 55, which, in turn, communicates with the additive pathway 53.

Before dispensing a think, a technician must configure the drink dispensing system 10 by setting the flow rates of the diluent, concentrates, and additives to the desired flow rates that achieve the volumetric flow rate ratios necessary for proper tasting drinks. Illustratively, the technician measures at least the flow rate of the diluent, and, if necessary, the flow rates of the concentrate coupled with the concentrate pathway 39 and the additive coupled with the additive pathway 53. The technician then determines the adjustments necessary to produce the correct volumetric flow rate ratios (e.g., 24 to 1 diluent to concentrate). The technician adjusts the diluent flow rate controller until the actual flow rate of the diluent exiting the venturi-shaped mixing pathway 30 corresponds with the desired diluent flow rate. The technician accesses the control system 13 via the user input 14 and adjusts the voltage or the duration of the duty cycle applied to the pump 107 for the concentrate coupled with the concentrate pathway 39. In particular, the technician increases the voltage or the duration of the duty cycle applied to the pump 107 to increase the actual flow rate of the concentrate to the desired concentrate flow rate or decreases the voltage or the duration of the duty cycle applied to the pump 107 to decrease the actual flow rate of the concentrate to the desired concentrate flow rate. Alternatively, the control system 13 may include a look-up table of voltage or duty cycle values corresponding to desired concentrate flow rates that permit the technician to select a voltage level associated with various flow rates for the diluent. The technician then accesses the control system 13 via the user input 14 and adjusts the voltage or the duration of the duty cycle applied to the pump 107 for the additive coupled with the additive pathway 53 until the correct additive shot is delivered. In particular, the technician increases the voltage or the duration of the duty cycle applied to the pump 107 to increase the actual flow rate of the additive to the desired additive shot amount or decreases the voltage or the duration of the duty cycle applied to the pump 107 to decrease the actual flow rate of the additive to the desired additive shot amount. Alternatively, the control system 13 may include a look-up table of voltage or duty cycle values corresponding to desired additive shot amounts.

Responsive to the display of drink and additive choices by the user input 14, a user touches the user input 14 at a drink choice, in the present example, corresponds with the concentrate coupled with the concentrate pathway 39. The control system 13 registers the drink choice and in response thereto activates the diluent flow rate controller and the pump 107 coupled with the concentrate pathway 39. The diluent flows through the connector 34 and into the venturi-shaped mixing pathway 30. Likewise, the concentrate flows through the connector 35 and into the concentrate pathway 39. The concentrate enters the check valve 41, and, once the flow of the concentrate achieves the minimum operating pressure for the check valve 41, the check valve 41 opens to deliver the concentrate into the concentrate outlet 43 of the concentrate pathway 39.

The diluent inlet segment 31 of the venturi-shaped mixing pathway 30 receives the diluent therein where the decreasing cross-sectional area of the diluent inlet segment 31 constricts the flow of diluent thereby increasing its velocity and decreasing its pressure. The diluent inlet segment 31 delivers the diluent into the concentrate introduction segment 32 of the venturi-shaped mixing pathway 30 where the increasing cross-sectional area of the concentrate introduction segment 32 expands the flow of diluent thereby further decreasing its pressure. While the diluent flows through the cone introduction segment 32, the concentrate outlet 43 of the concentrate pathway delivers the concentrate into the concentrate introduction segment 32. The decreased pressure of the diluent flowing through concentrate introduction segment 32 assists in drawing the concentrate into the diluent flow for mixing therewith. The mixing outlet segment 33 of the venturi-shaped mixing pathway 30 receives the mixed diluent and concentrate therein where the increasing cross-sectional area of the mixing outlet segment 33 decreases the velocity of the mixed diluent and concentrate prior to their exit from the mixing outlet segment 33 onto the diffuser 17. The mixed diluent and concentrate spreads along the diffuser 17 to further reduce their velocity. The mixed diluent and concentrate flows from the diffuser 17 into the nozzle housing 16 and then from the outlet 68 of the nozzle housing 16 into a container below the nozzle housing 16, thereby forming a drink for the user.

A drink choice may include the incorporation of an additive whereby a user touches the user input 14 at an additive choice, which, in the present example, corresponds with the concentrate coupled with the additive pathway 53. The control system 13 registers the additive choice and in response thereto activates the pump 107 coupled with the additive pathway 53. The additive flows through the connector 55 and into the additive pathway 53. The additive flows through the additive pathway 53 and to the nozzle 61 of the additive pathway 53 for delivery onto the diffuser 17 via the nozzle outlet 60. The additive contacts the mixed diluent and concentrate in the diffuser 17 and mixes therewith. The mixed diluent, concentrate, and additive flows from the diffuser 17 into the nozzle housing 16 and then from the outlet 68 of the nozzle housing 16 into a container below the nozzle housing 16, thereby forming a drink for the user. Although the post-mix drink dispenser 5 of the first embodiment delivers additives through the additive pathways, one of ordinary skill in the art will recognize that a viscous additive such as cane sugar may be delivered through one of the concentrate pathways.

The control system 13 maintains the diluent flow rate controller, the pump 107 coupled with the concentrate pathway 39, and if selected the pump 107 coupled with the additive pathway 53 activated during the user initiated drink dispense. The user initiated drink dispense begins with the user touching the user input 14 to make a drink choice and if desired an additive choice and ends when the user breaks contact with the user input 14 or after the expiration of a drink dispense time period. The diluent flow rate controller and the pump 107 coupled with the concentrate pathway 39 remain activated during the user initiated drink dispense, whereas the pump 107 coupled with the additive pathway 53 remains activated only for a period of time necessary to deliver an additive shot into the dispensed drink. Upon the user breaking contact with the user input 14 or the expiration of the drink dispense time period, the control system 13 deactivates the diluent flow rate controller, the pump 107 coupled with the concentrate pathway 39, and if activated the pump 107 coupled with the additive pathway 53. The control system 13 may continue the flow of diluent briefly after the control system 13 ceases the flow of concentrate to ensure concentrate removal from the concentrate outlet 43 of the concentrate pathway 39.

Figure 10:
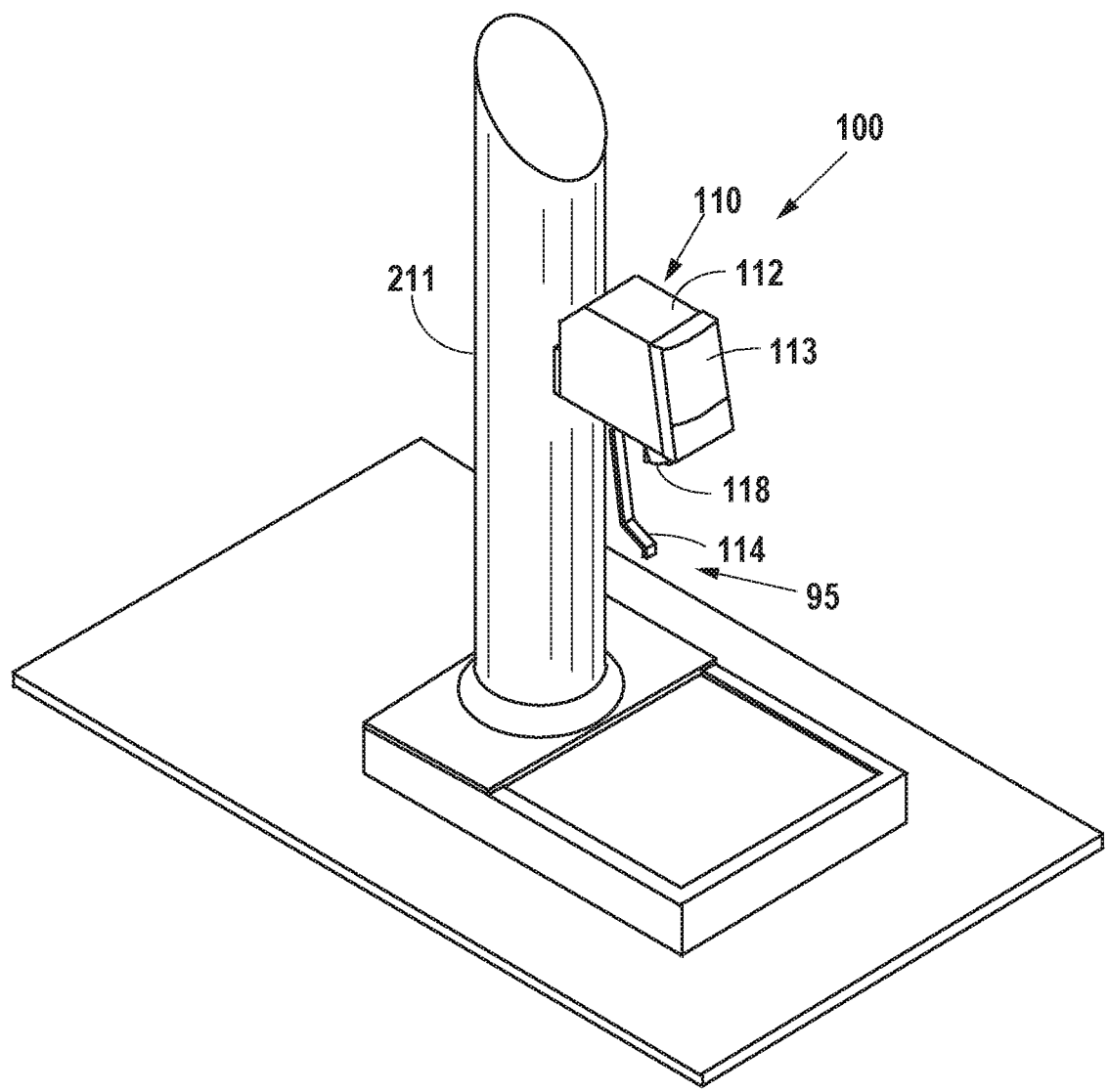
FIG. 10 is an isometric view illustrating a high diluent to concentrate volumetric ratio post-mix drink dispenser according to a second embodiment incorporated into an example drink dispensing system.
Figure 11:
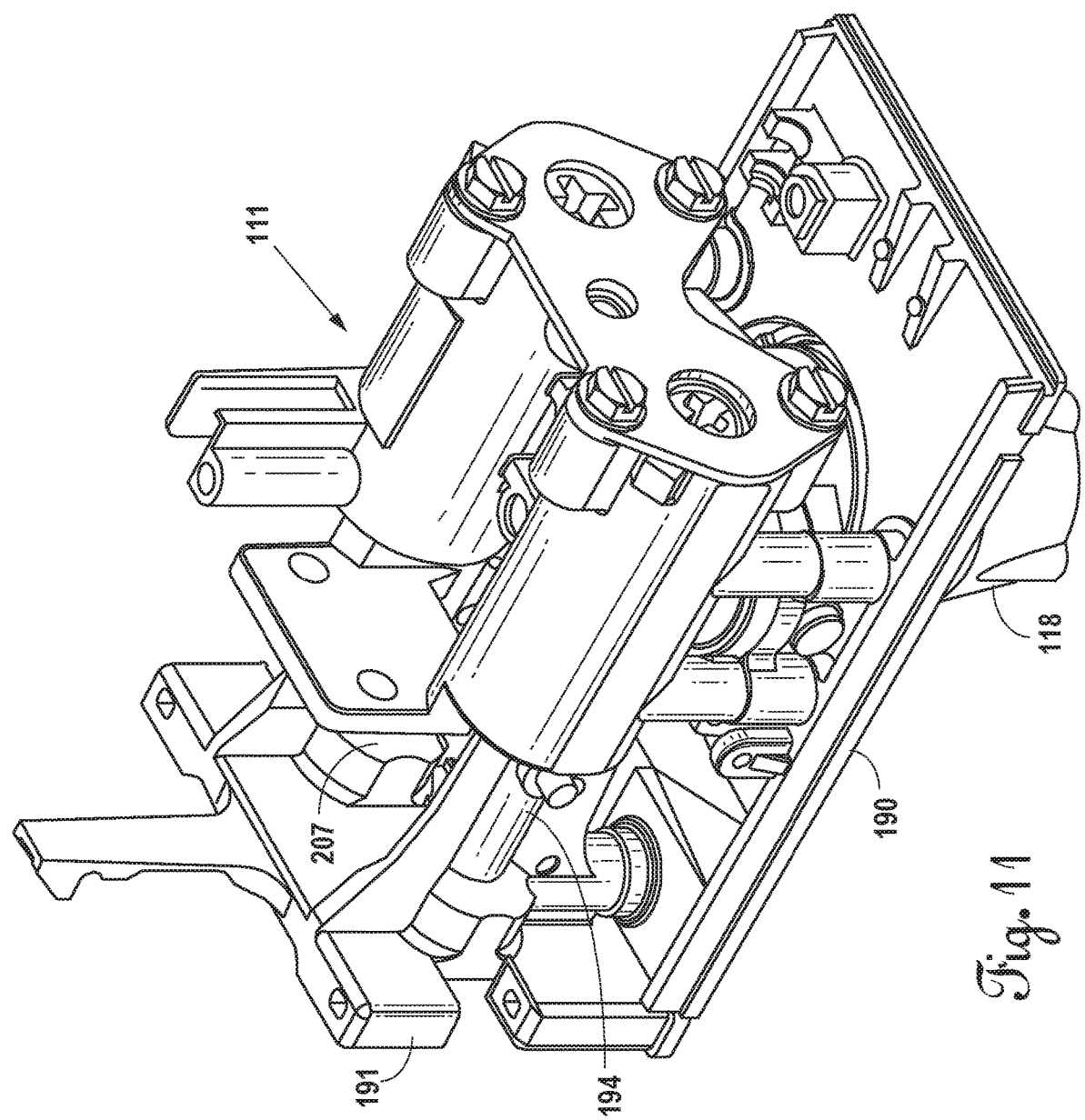
FIG. 11 is an isometric view illustrating the post-mix drink dispenser according to the second embodiment.
Figure 12:
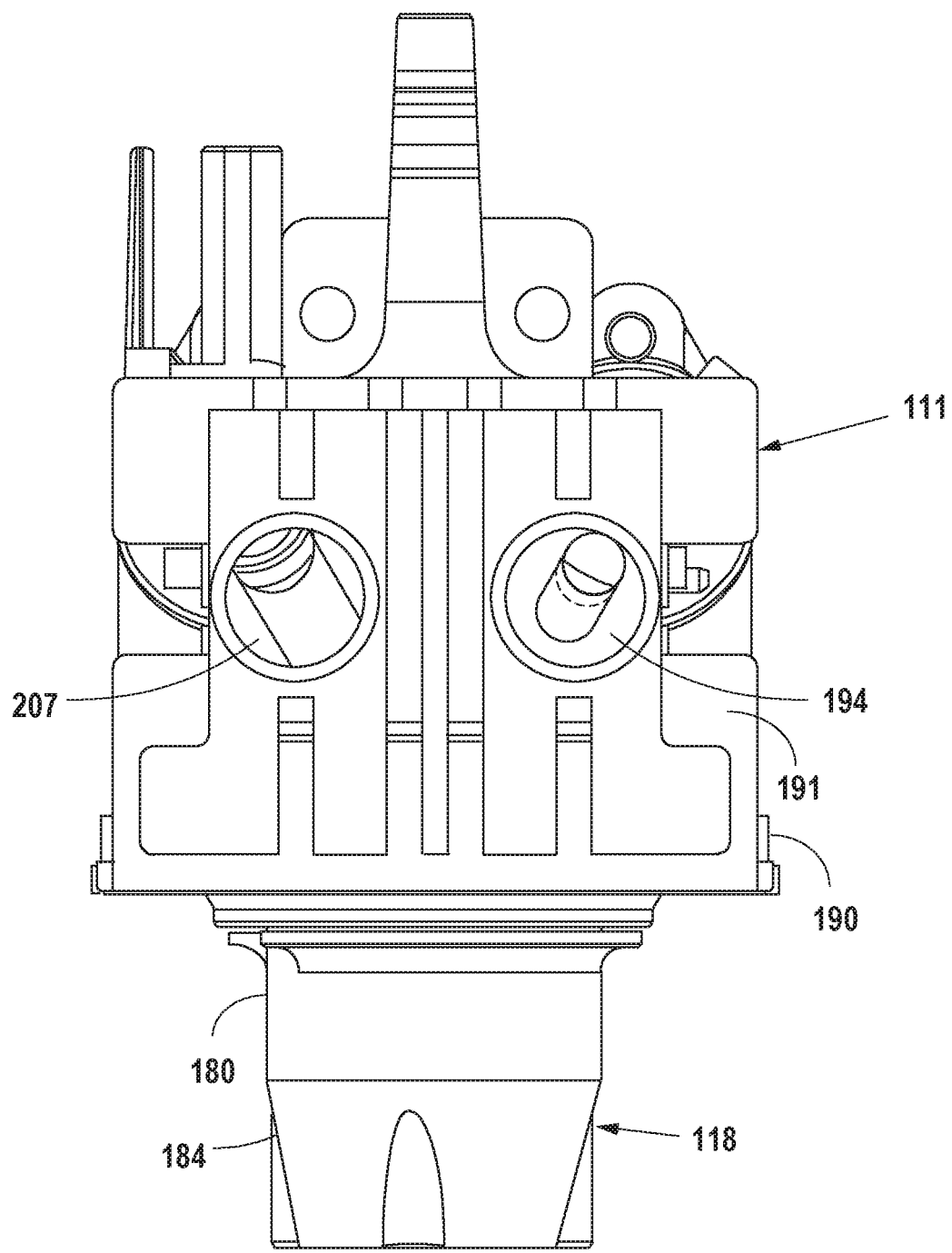
FIG. 12 is a rear elevational view illustrating the post-mix drink dispenser according to the second embodiment.
Figure 13:
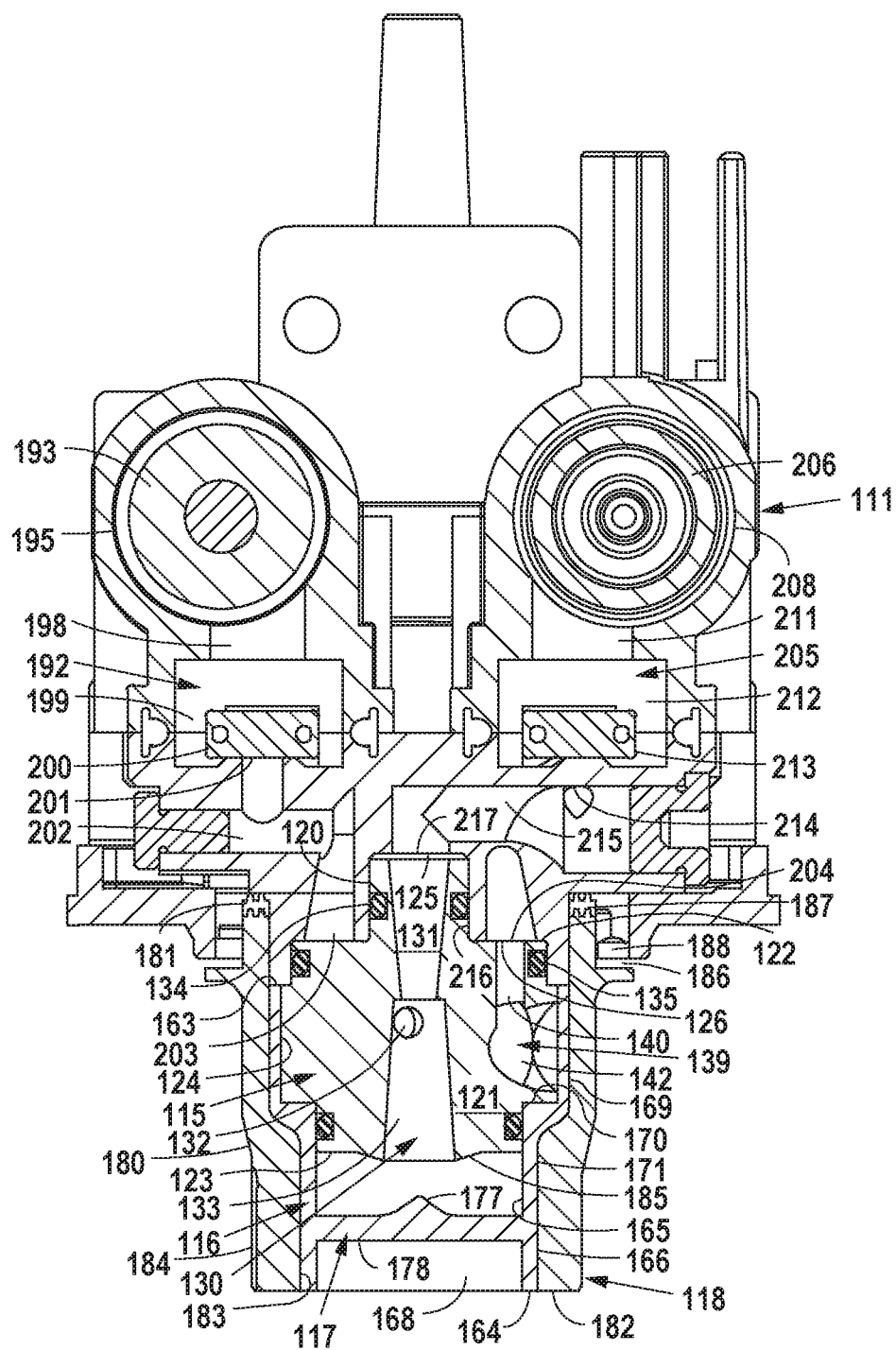
FIG. 13 is a cross-sectional elevation view illustrating the post-mix drink dispenser according to the second embodiment.
Figure 14:
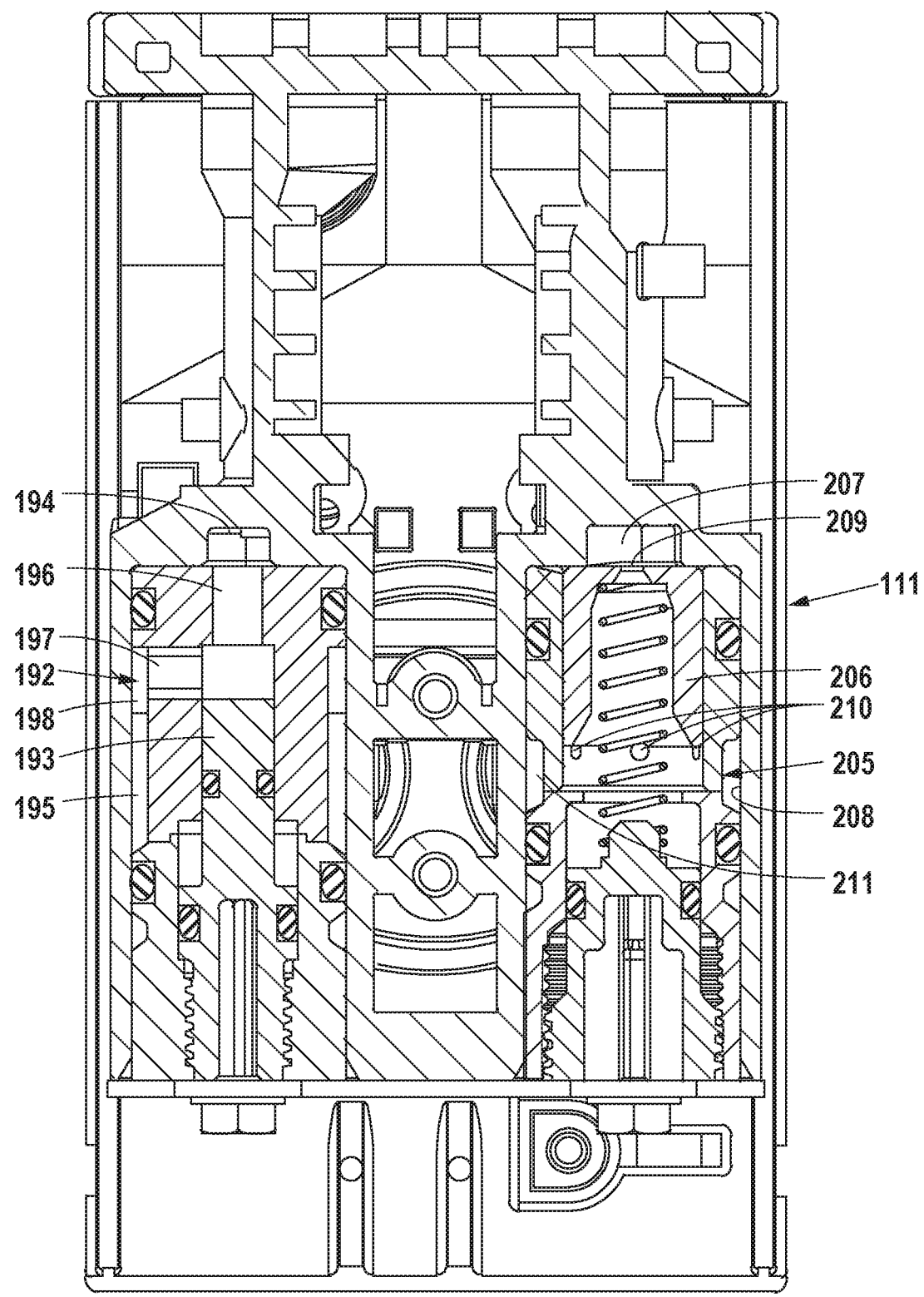
FIG. 14 is a cross-sectional plan view illustrating the post-mix drink dispenser according to the second embodiment.

FIG. 10 illustrates a high diluent to concentrate volumetric ratio post-mix drink dispenser 110 according to a second embodiment of the present invention incorporated into an example drink dispensing system 95. Once incorporated into the drink dispensing system 95, the post-mix drink dispenser 110 provides the drink dispensing system 95 with the capability to dispense a high diluent to concentrate volumetric ratio post-mix drink. In the second embodiment, the post-mix drink dispenser 110 delivers a diluent, such as plain or carbonated water, for mixing with a viscous concentrate, such as juice (e.g., coconut, acai, mango, papaya), coffee, tea, sweeteners (e.g., honey), and the like.

Referring to FIGS. 10-26, the post-mix drink dispenser 110 includes a mixer 115, a nozzle housing 116, and optionally a diffuser 117 and a nozzle cover 118. The post-mix drink dispenser 110 includes a valve body 111 that supports the mixer 115 and delivers diluent and concentrate thereto. The valve body 111 includes a platform 190 that provides a base for the valve body 111 and a wall 191 that facilitates connection of the valve body 111 with a back block of the drink dispensing system 100. The post-mix drink dispenser 110 includes a cover 112 and a face plate 113 that protect the valve body 111. The post-mix drink dispenser 110 includes a lever 114 that facilitates user activation thereof.

The valve body 111 defines a concentrate delivery passageway 192 that delivers concentrate to the mixer 115. The concentrate delivery passageway 192 includes a flow rate controller 193 that is adjustable to control the flow rate of the concentrate delivered to the mixer 115. The valve body 111 defines the concentrate delivery passageway 192 as follows.

A concentrate inlet conduit 194 communicates with a flow control chamber 195. The flow rate controller 193 inserts within the flow control chamber 195 such that an entrance 196 or 296 into the flow rate controller 193 aligns with the concentrate inlet conduit 194 and an exit 197 or 297 from the flow rate controller 193 aligns with an outlet 198 of the flow control chamber 195. The outlet 198 of the flow control chamber 195 communicates with a valve chamber 199 having a valve seal 200 therein disposed over an inlet 201 into a channel 202. The channel 202 communicates with a cavity 203 that receives a portion of the mixer 115 therein such that the cavity 203 at an outlet 204 delivers concentrate into the mixer 115. The concentrate delivery passageway 192 accordingly comprises the concentrate inlet conduit 194, the flow control chamber 195 with the flow rate controller 193 disposed therein, the valve chamber 199 with the valve seal 200 therein, the channel 202, and the cavity 203.

The valve body 111 defines a diluent delivery passageway 205 that delivers diluent to the mixer 115. The diluent delivery passageway 205 includes a flow rate controller 206 that is adjustable to control the flow rate of the diluent delivered to the mixer 115. The valve body 111 defines the diluent delivery passageway 205 as follows. A diluent inlet conduit 207 communicates with a flow control chamber 208. The flow rate controller 206 inserts within the flow control chamber 208 such that an entrance 209 of the flow rate controller 206 aligns with the diluent inlet conduit 207 and exits 210 of the flow rate controller 206 communicate with an outlet 211 of the flow control chamber 208. The outlet 211 of the flow control chamber 208 communicates with a valve chamber 212 having a valve seal 213 therein disposed over an inlet 214 into a channel 215. The channel 215 communicates with a cavity 216 that receives a portion of the mixer 115 therein such that the channel 215 at an outlet 217 delivers diluent into the mixer 115. The diluent delivery passageway 205 accordingly comprises the diluent inlet conduit 207, the flow control chamber 208 with the flow rate controller 206 disposed therein, the valve chamber 212 with the valve seal 213 therein, the channel 215, and the cavity 216. The valve body 111 in the second embodiment that forms the diluent delivery passageway 205 and the concentrate delivery passageway 192 may be manufactured using any suitable method such as injection molding either as a single piece or multiple pieces assembled using any necessary plugs and suitable fasteners such as screws.

Figure 15:
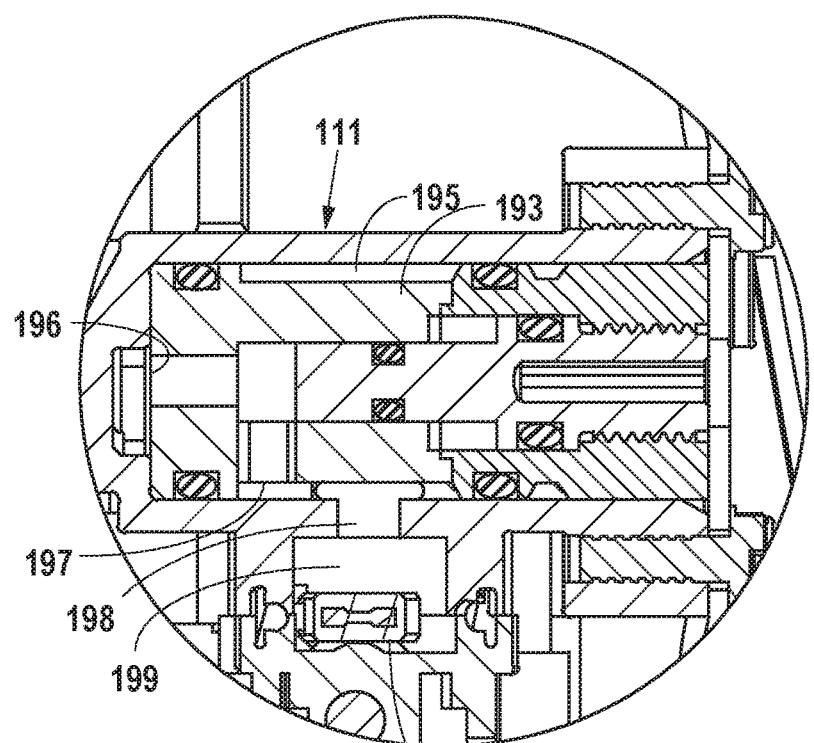
FIG. 15 is a cross-sectional elevation view illustrating a concentrate flow controller of the post-mix drink dispenser according to the second embodiment.
Figure 16:
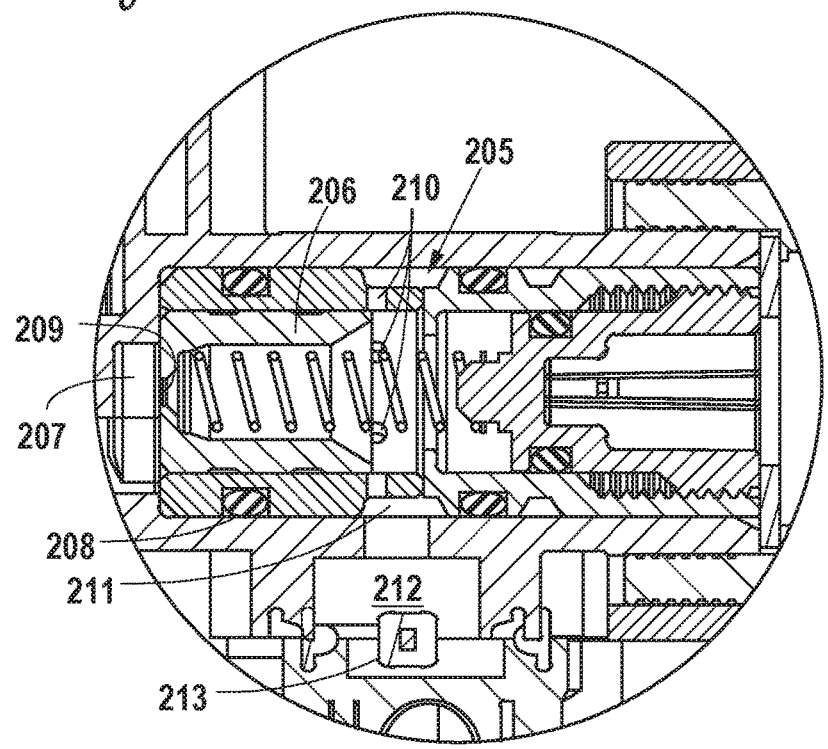
FIG. 16 is a cross-sectional elevation view illustrating a diluent flow controller of the post-mix drink dispenser according to the second embodiment.

The flow rate controller 193 in the second embodiment may be any suitable flow rate controller such as a Brix screw illustrated in FIG. 15, which is a manually adjustable plug valve with a side port having a circular or trapezoidal shape. A technician adjusts the plug valve to vary the size of the opening from the side port and thus the rate of concentrate flow from the Brix screw. Although the Brix screw illustrated in FIG. 15, which is a standard flow rate controller, operates adequately to regulate the flow of concentrate through the concentrate delivery passageway 192 and to the mixer 115, the post-mix drink dispenser 110 due to the highly viscous concentrate flowing therethrough requires precise control over the delivery of that highly viscous concentrate. In view thereof, the flow rate controller 193 in the second embodiment is preferably a flow rate controller 250 illustrated in FIGS. 15A-15C. The flow rate controller 250, which in the second embodiment includes a body 251, an insert 252, and an adjustment screw 253, provides precise adjustments in the flow rate of the highly viscous concentrate flowing therethrough such that the flow rate controller 250 delivers an optimal amount of concentrate to the mixer 115.

The body 250 includes an inlet section 254, an exit section 255, and an adjustment section 256. The inlet section 254 defines an inlet channel 257 interior thereto and a groove 258 exterior thereto adapted to receive an o-ring therein. The inlet section 254 is sized to frictionally engage the flow control chamber 195 while the o-ring in the groove 258 fluidly seals the inlet section 254. The exit section 255 defines an exit channel 259 interior thereto that terminates in an exit aperture 260, The exit section 255 is sized such that the exit section 255 is spaced apart from the flow control chamber 195 in order to create an exit chamber 299 in the flow control chamber 195 that communicates with the outlet 198 thereof. The size and shape of the exit aperture 260 allow precise adjustments to be made in the flow rate of a highly viscous concentrate flowing through the flow rate controller 250. Moreover, the exit aperture 260, due to its size and shape, facilitates a uniform and stable flow of the highly viscous concentrate therethrough that enables establishment of a substantially constant predetermined concentrate flow rate while preventing the highly viscous concentrate and the particulates often contained therein from fouling the exit aperture 260. In particular, the exit aperture 260 is elongated with a length to width ratio of greater than 4:1 and, preferably, up to a length to width ratio of 8.9:1. The adjustment section 256 defines interior thereto an adjustment cavity 261 communicating with an adjustment channel 262, which, in turn, communicates with the exit channel 259 and a groove 263 exterior thereto adapted to receive an o-ring therein. The adjustment section 256 is sized to frictionally engage the flow control chamber 195 while the o-ring in the groove 263 fluidly seals the adjustment section 256. The body 250 includes tabs 264 that align the body 250 within the flow control chamber 195, The body 250 is preferably molded from a suitable plastics material, such as Acetal, Polypropylene, or Tritan.

The insert 252 operates with the adjustment screw 253 to provide precise adjustments in the flow rate of a highly viscous concentrate flowing through the flow rate controller 250. The insert 252, which is cylindrical in shape with a first end 278 and a second end 279, defines a passage 265 therethrough and is sized to fit within the adjustment cavity 261. An interior surface 266 of the insert 252 includes threads which have a thread count of greater than 24 threads per 1 inch and, preferably, up to a thread count of 50 threads per 1 inch. An exterior surface 268 of the insert 252 is sized to fit within and frictionally engage the adjustment cavity 261. The exterior surface 268 includes knurling 269 that enhances frictional engagement of the insert 252 within the adjustment cavity 261. The insert 252 in order to include a thread count of greater than 24 threads per 1 inch is preferably machined from a suitable metal such as brass.

Figure 15A:
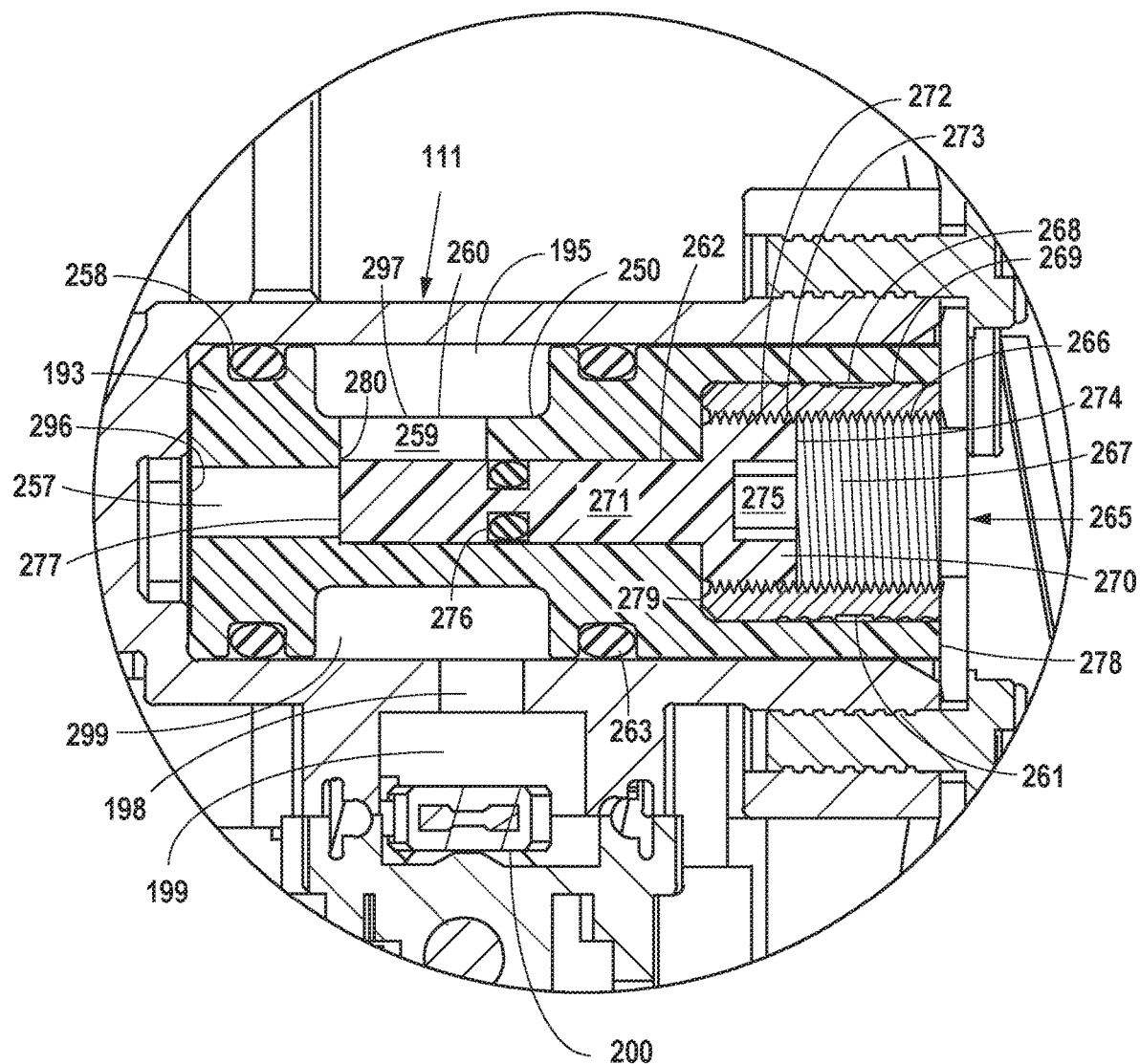
FIG. 15A is a cross-sectional elevation view illustrating a preferred concentrate flow controller of the post-mix drink dispenser according to the second embodiment.
Figure 15B:
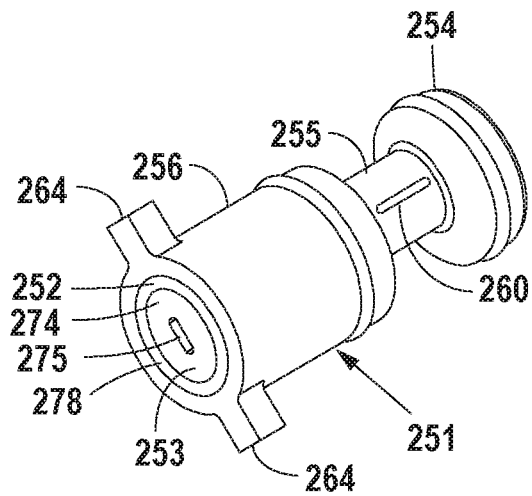
FIG. 15B is an isometric view illustrating the preferred concentrate flow controller of the post-mix drink dispenser according to the second embodiment.
Figure 15C:
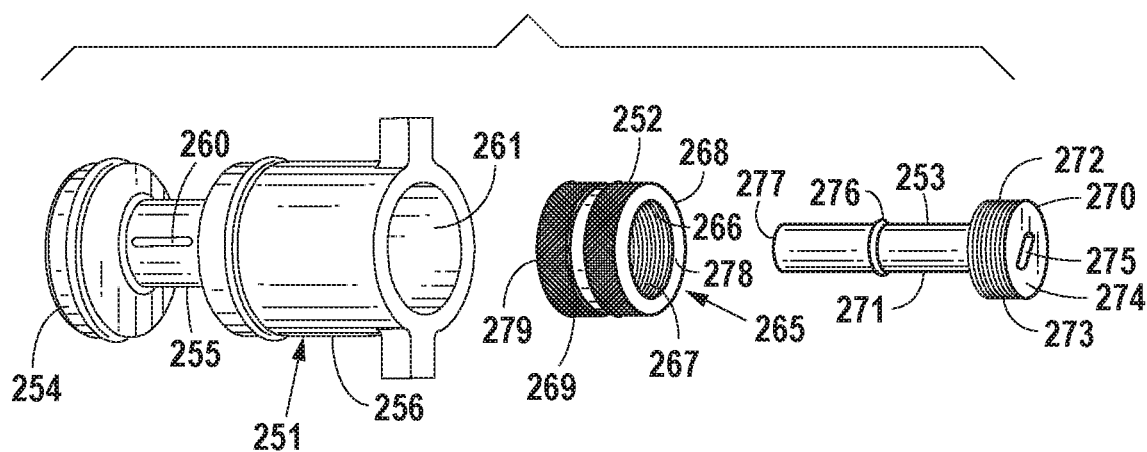
FIG. 15C is an exploded isometric view illustrating the preferred concentrate flow controller of the post-mix drink dispenser according to the second embodiment.
Figure 17:
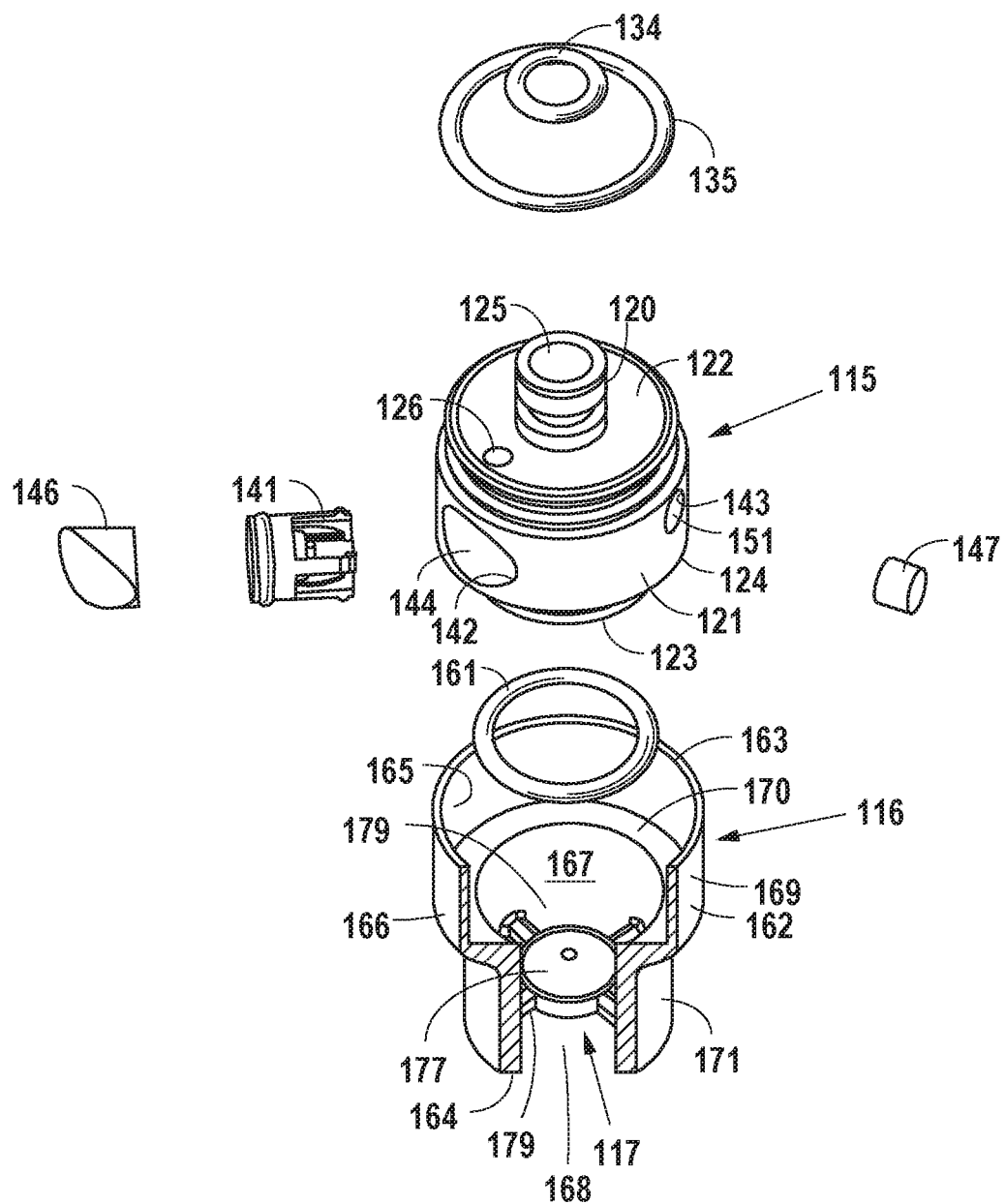
FIG. 17 is an exploded isometric view with a partial cut-away illustrating a mixer of the post-mix drink dispenser according to the second embodiment.
Figure 18:
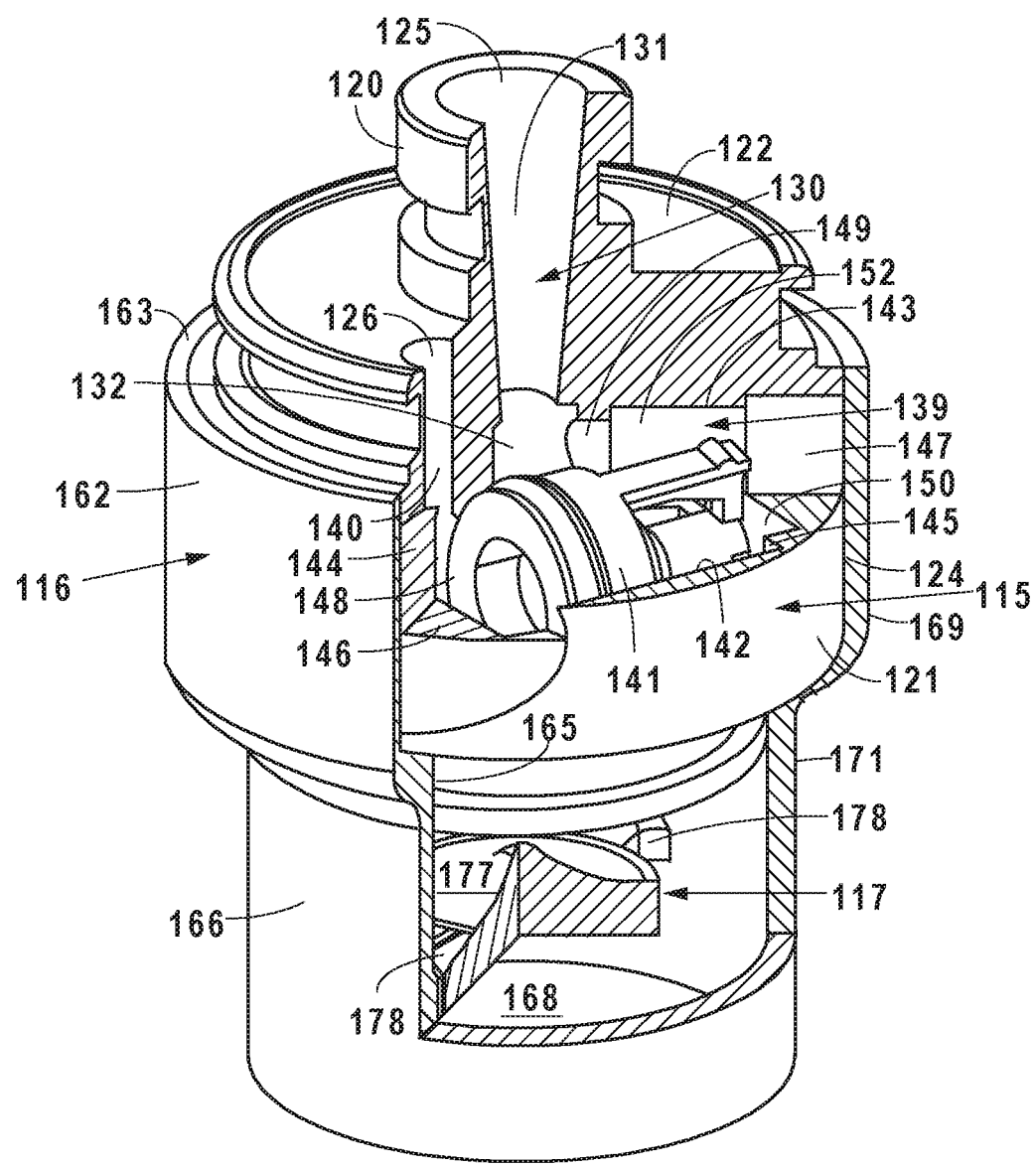
FIGS. 18-19 are isometric views with a partial cut-away illustrating a mixer of the post-mix drink dispenser according to the second embodiment.
Figure 19:
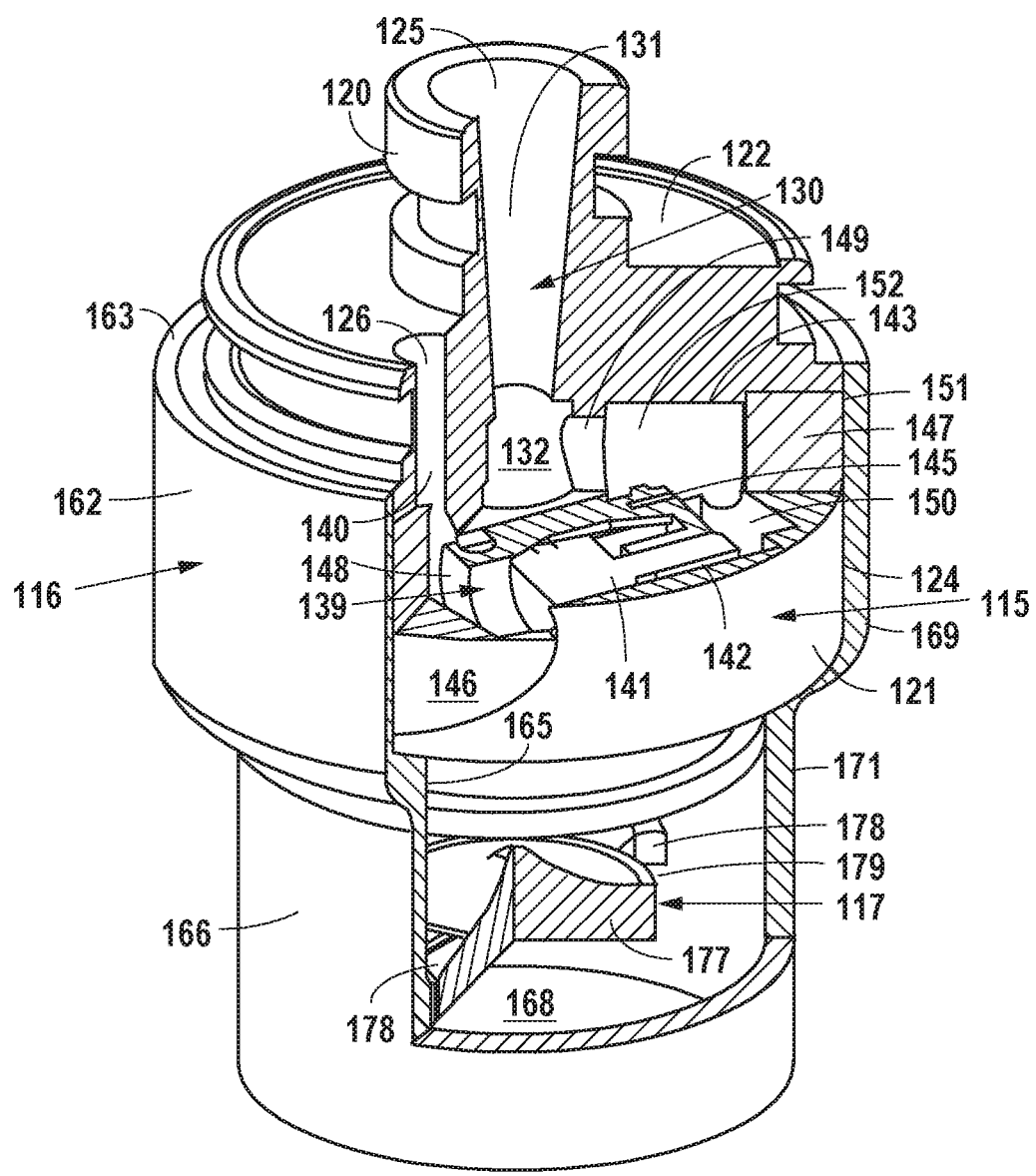
Figure 20:
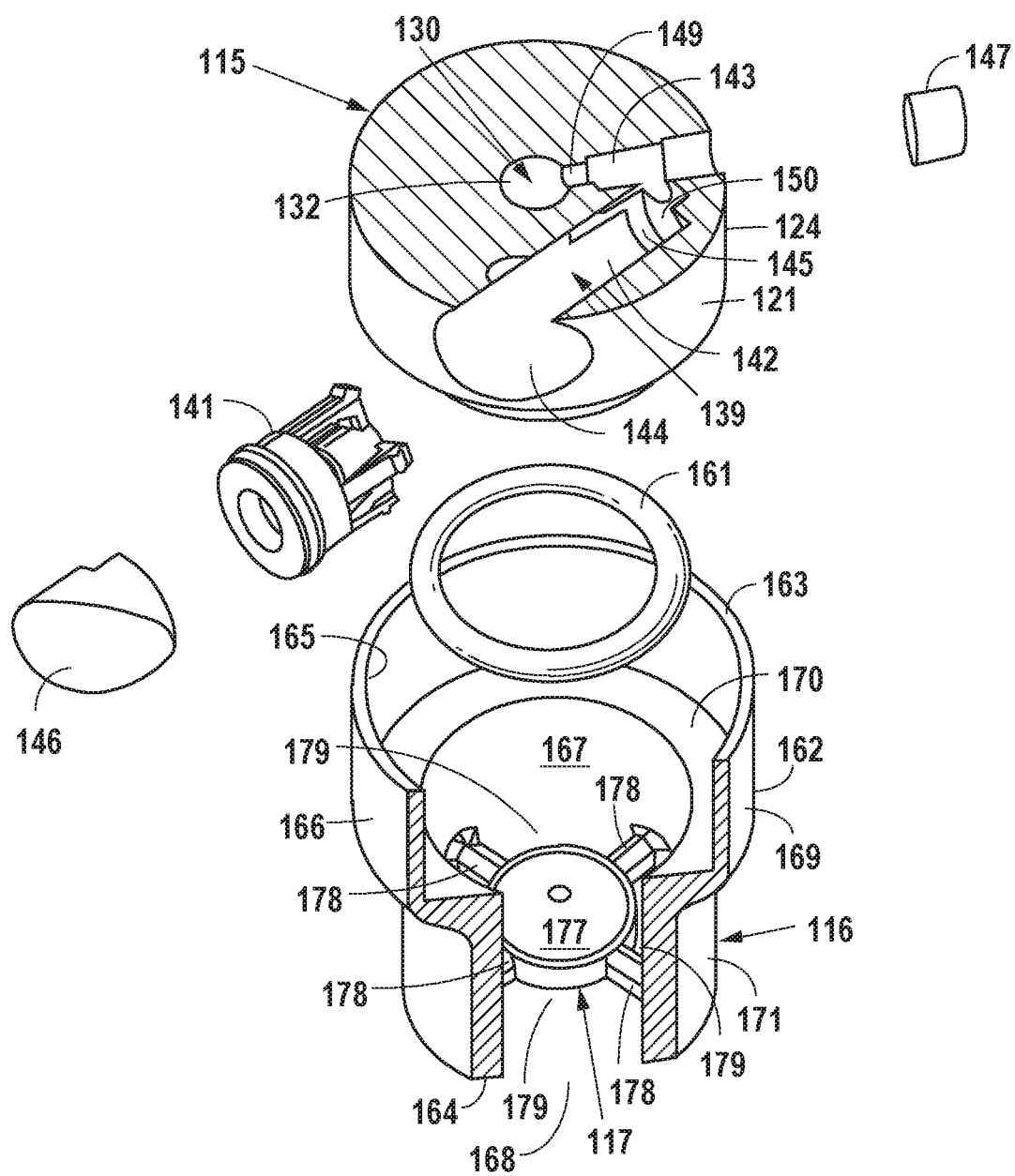
FIG. 20 is an exploded isometric view with a partial cut-away illustrating a mixer of the post-mix drink dispenser according to the second embodiment.
Figure 25:
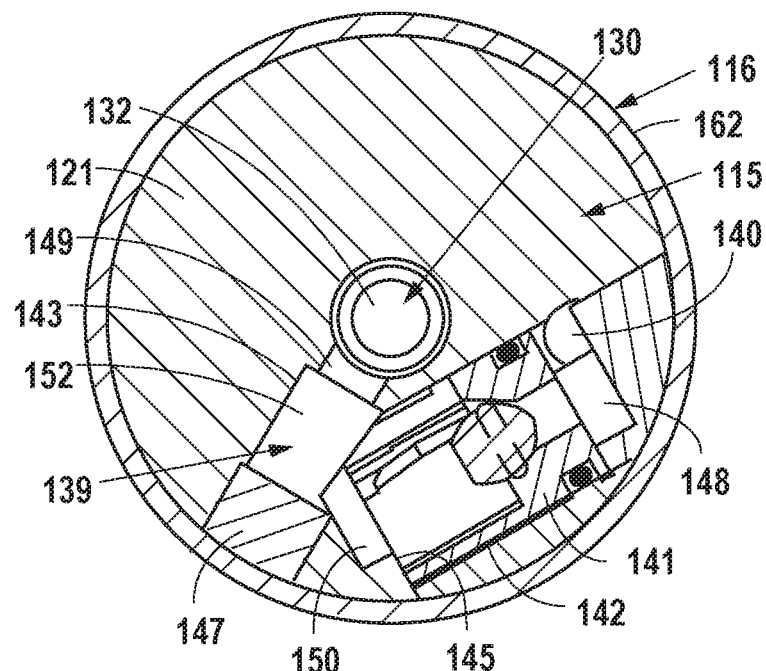
FIG. 25 is a cross-sectional plan view taken along lines D-D of FIG. 22 illustrating the mixer of the post-mix drink dispenser according to the second embodiment.
Figure 26:
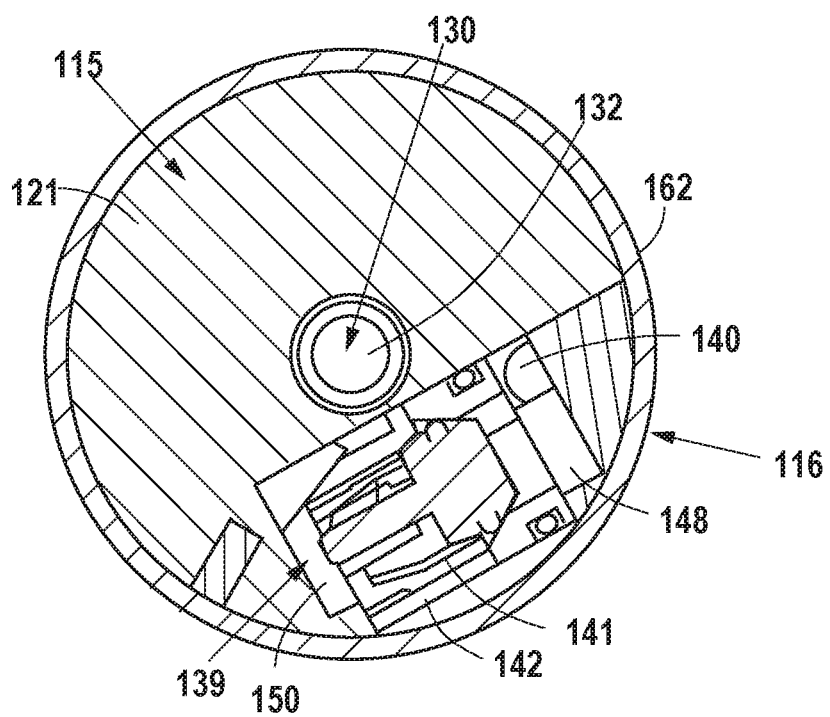
FIG. 26 is a cross-sectional plan view taken along lines E-E of FIG. 22 illustrating the mixer of the post-mix drink dispenser according to the second embodiment.

The adjustment screw 253 includes a head 270 and a shank 271. An exterior surface 272 of the head 270 includes threads 273, which are sized to engage the threads 267 of the insert 252 and thus have a thread count of greater than 24 threads per 1 inch and, preferably, up to a thread count of 50 threads per 1 inch. A front face 274 of the head 270 includes a slot 275 engageable with a tool such as a screwdriver to allow movement of the adjustment screw 253 within the insert 252. The shank 271 includes a groove 276 adapted to receive an o-ring therein. The shank 271 is sized to frictionally engage the adjustment channel 262 while the o-ring in the groove 258 fluidly seals the shank 271. The shank 271 further includes a length that permits the shank 271 to extend into the exit channel 259 such that movement of the head 270 within the insert 252 concurrently moves the shank 271 in the exit channel 259 between a closed position and a fully open position. In the closed position, as illustrated in FIG. 15A, an end 277 seals the inlet channel 257 of the inlet section 254 thereby blocking concentrate flow through the exit channel 259. The shank 271 moves from its closed position through intermediate positions that partially block the exit channel 259 and finally to a fully open position, as illustrated in FIG. 15B, whereby the front face 274 of the shank 271 aligns with the first end 278 of the insert 252 and the end 277 of the shank 271 resides adjacent the adjustment channel 262 such that the shank 271 no longer partially blocks the exit channel 259 and the exit channel 259 is fully open. The adjustment screw 253 in order to include a thread count of greater than 24 threads per 1 inch is preferably machined from a suitable plastics material, such as Acetal, Polypropylene, or Tritan.

Assembly of the flow rate controller 250 includes the introduction of the insert 252 into the adjustment cavity 261 until the second end 279 of the insert 252 abuts an end of the adjustment cavity 261 adjacent the adjustment channel 262 and the insert 252 resides fully within the adjustment cavity 261. Assembly of the flow rate controller 250 further includes engaging the threads 273 of the adjustment screw 253 with the threads 267 of the insert 252 and threading the adjustment screw 253 into an initial position, which typically is its closed position. Once assembled, the flow rate controller 250 inserts into the flow control chamber 195 until the tabs 264 align with a respective receiving notch in the valve body 111 and the flow rate controller 250 resides fully within the flow control chamber 195. Upon the insertion of the flow rate controller 250 fully into the flow control chamber 195, the inlet channel 257 at the entrance 296 aligns with the concentrate inlet conduit 194 and the exit channel 259 via the exit aperture 260 communicates with the exit chamber 299 which, in turn, communicates with the outlet 198 of the flow control chamber 195.

Adjustment of the flow rate controller 250 involves engaging the slot 275 of the head 270 with a tool and rotating the head 270 within the insert 252 such that the shank 271 moves along the adjustment channel 262 and the exit channel 259 to either increase or decrease the size of an entrance 280 into the exit channel 259. The end 279 of the shank 271 and its spacing relative to the inlet section 254 and the inlet channel 257 thereof defines the size of the entrance 280 into the exit channel 259. In particular, the entrance 280 is closed as illustrated in FIG. 15A when the end 279 of the shank 271 abuts the inlet section 254, the entrance 280 is partially open when the end 279 of the shank 271 is spaced apart from the inlet section 254 and the inlet channel 257 while remaining within the exit channel 259, and the entrance 280 is fully open when the end 277 of the shank 271 resides adjacent the adjustment channel 262.

Concentrate entering the inlet channel 257 via the entrance 296 flows to the entrance 280, the size of which is determined by the distance the end 277 of the shank 271 resides from the inlet section 254 and thus the inlet channel 257. The concentrate flows through the entrance 280 and into the exit channel 259, thereby filling the exit channel 259 with concentrate. Concentrate from within the filled exit channel 259 exits therefrom via the exit aperture 260 and flows into the exit chamber 299 for delivery to the outlet 198.

The exit aperture 260 includes an elongate size and shape with a length to width ratio of greater than 4:1 and, preferably, up to a length to width ratio of 8.9:1 in order to necessitate an extended travel of the shank 271 away from the inlet section 254 and thus the inlet channel 257 before the entrance 280 reaches a size that enables a concentrate filled exit channel 259 and the exit aperture 260 to deliver concentrate into the exit chamber 299 at a desired concentrate flow rate. In particular, the length to width ratio of the exit aperture 260 results in a long narrow slot presenting a shape that requires the size of the entrance 280 reach a preset minimum before the concentrate flow therethrough into the exit channel 259 and from the exit aperture 260 achieves a rate sufficient for precise and final adjustment of the flow rate controller 250 to a desired concentrate flow rate. The longer travel of the shank 271 within the exit channel 259 required by the elongate size and shape of the exit aperture 260 creates an entrance 280 larger relative to entrances for less narrow circular or trapezoidal apertures such that the entrance 280, the exit channel 259, and the exit aperture 260 provide a stable, uniform, and constant flow of highly viscous concentrate therethrough and further do not foul with the highly viscous concentrate.

Once the entrance 280 reaches or advances beyond its preset minimum and the highly viscous concentrate attains a flow rate near a desired flow rate, a precise final adjustment in the flow rate of the highly viscous concentrate must be performed. The flow rate controller 250 provides precise final adjustments in concentrate flow rate due to the insert 252 and the head 270 of the adjustment screw 253 including a thread count of greater than 24 threads per 1 inch and, preferably, up to a thread count of 50 threads per 1 inch. In particular, the movement of the head 270 along the insert 252 translates into precise incremental movements of the shank 271 within the exit channel 259 relative to the inlet section 254 and thus the inlet channel 257 due to the thread count of the head 270 and the insert 252 being greater than 24 threads per 1 inch and, preferably, up to a thread count of 50 threads per 1 inch. As such, the head 270 and the insert 252 facilitate precise incremental adjustments in the size of the entrance 280 such that an actual flow rate of highly viscous concentrate through the flow rate controller 250 substantially, completely equals a desired flow rate for the highly viscous concentrate. The head 270 and the insert 252, due to their thread counts being greater than 24 threads per 1 inch and, preferably, up to a thread count of 50 threads per 1 inch, improve over lesser thread counts because the head 270 and the insert 252 permit extremely accurate adjustments in concentrate flow rates.

The flow rate controller 206 in the second embodiment may be any suitable flow rate controller such as a solenoid operated flow rate control valve including a spring-loaded ceramic piston well known to one of ordinary skill in the art. A technician adjusts the spring-loaded ceramic piston to vary the size of exits therefrom and thus the rate of diluent flow from the solenoid operated flow rate control valve.

The valve seals 200 and 213 in the second embodiment may be any suitable valve seals such as paddle arms, which have a paddle head and paddle shaft, well known to one of ordinary skill in the art. The lever 114 of the post-mix drink dispenser 110 pivotally connects with the valve body 111 to facilitate user activation of the valve seals 200 and 213. Illustratively, the valve seals 200 and 213 may be solenoid operated whereby activation of the lever 114 by a user facilitates closure (e.g., either through direct contact or via a control system of the drink dispensing system 95) of a circuit powering the solenoids coupled with the valve seals 200 and 213 such that the valve seal 200 moves from the inlet 201 of the channel 202 and the valve seal 213 moves from the inlet 214 of the channel 215 and 213 to allow the delivery of concentrate and diluent, respectively, through the concentrate delivery passageway 192 and the diluent delivery passageway 205. Alternatively, the lever 114 may manually move the valve seals 200 and 213 to allow delivery of concentrate and diluent, respectively, through the concentrate delivery passageway 192 and the diluent delivery passageway 205.

The mixer 115 includes a body 121 having in the first embodiment a cylindrical shape with an inlet surface 122 and an outlet surface 123 between a side surface 124. The mixer 115 defines a venturi-shaped mixing pathway 130. The venturi-shaped mixing pathway 130 includes a diluent inlet segment 131 communicating with a concentrate introduction segment 132, which, in turn, communicates with a mixing outlet segment 133. The diluent inlet segment 131 tapers in a decreasing cross-sectional area in order to provide a constriction to the flow of diluent through the venturi-shaped mixing pathway 130 that increases diluent velocity while also decreasing diluent pressure. The diluent inlet segment 131 delivers the diluent into the concentrate introduction segment 132, which, accordingly, has a cross-sectional area greater than the diluent inlet segment 131. The greater cross-sectional area of the concentrate introduction segment 132 relative to the diluent inlet segment 131 relieves the constriction to the flow of diluent in the venturi-shaped mixing pathway 130 through a sudden expansion that results in a further decrease in diluent pressure. The pressure decrease creates a low pressure region in the concentrate introduction segment 132 at the point of concentrate delivery into the venturi-shaped mixing pathway 130 that promotes introduction of the concentrate into the diluent for mixing therewith. The concentrate introduction segment 132 delivers the mixed diluent and concentrate into the mixing outlet segment 133, which expands in an increasing cross-sectional area away from the concentrate introduction segment 132, thereby decreasing the velocity of the mixed diluent and concentrate prior to their exit from the venturi-shaped mixing pathway 130.

The mixer 115 at the inlet surface 122 includes a boss 120 defining a diluent port 125 that communicates with the venturi-shaped mixing pathway 130 at the diluent inlet segment 131. The boss 120 inserts within the cavity 216 of the valve body 111 until the boss 120 at a top portion thereof abuts a section of the valve body 111 defining an upper portion of the cavity 216. Moreover, the boss 120 closes the cavity 216 such that the diluent port 125 aligns with the outlet 217 of the channel 215 in the valve body Hi to receive diluent therein and deliver the diluent into the diluent inlet segment 131. The boss 120 accepts a seal 134 thereabout that fluidly seals the boss 120 within the cavity 216.

The mixer 115 at the inlet surface 122 includes a concentrate port 126 that communicates with a concentrate pathway 139 defined by the mixer 115. The mixer 115 inserts within the cavity 203 of the valve body 111 until the inlet surface 122 abuts a section of the valve body 111 defining a lower portion of the cavity 203. Moreover, the inlet surface 122 of the mixer 115 closes the cavity 203 such that the concentrate port 126 aligns with the outlet 204 of the channel 203 in the valve body 111 to receive concentrate therein and deliver the concentrate into the concentrate pathway 139. The mixer 115 accepts a seal 135 thereabout that fluidly seals the mixer 115 within the cavity 203.

The concentrate pathway 139 communicates with the concentrate introduction segment 132 of the venturi-shaped mixing pathway 130 to deliver concentrate therein. The concentrate pathway 139 includes a check valve 141. The check valve 141 ensures the viscous concentrate within the concentrate pathway 139 experiences a minimum pressure before the concentrate pathway 139 delivers the concentrate into the concentrate introduction segment 132. The minimum pressure necessary before the check valve 141 allows the viscous concentrate to flow through the concentrate pathway 139 produces a uniform, stable, and consistent flow of viscous concentrate into the concentrate introduction segment 132.

Moreover, the check valve 141 prevents the viscous concentrate from seeping into the venturi-shaped mixing pathway 130 after concentrate delivery ceases. Viscous concentrates due to their thick consistencies tend to ooze along a path when not restrained. Upon cessation of concentrate delivery, the pressure of the concentrate within the concentrate pathway 139 rapidly diminishes below the minimum operating pressure of the check valve 141, resulting in the prompt closing of the check valve 141. The minimum operating pressure of the check valve 141 exceeds any pressure exerted by the stopped viscous concentrate, thereby preventing concentrate from seeping into the venturi-shaped mixing pathway 130. Although the concentrate pathway 139 includes the check valve 141 to prevent concentrate ooze, the mixer 115, in the event diluent and concentrate remains in the mixing outlet segment 133 of the venturi-shaped mixing pathway 130 after a dispense, defines a boss 185 at the outlet surface 123 to prevent undispensed diluent and concentrate from migrating out of the mixing outlet segment 133. The boss 185 protrudes from the body 121 to surround the mixing outlet segment 133 and provide a distinct edge thereabout such that any undispensed diluent and concentrate due to surface tension stays in the mixing outlet segment 133 and does not ooze therefrom.

The mixer 115 defines a concentrate inlet conduit 140 that receives concentrate from the channel 203 of the valve body 111 via the concentrate port 126. The concentrate inlet conduit 140 communicates with a concentrate valve cavity 142. In turn, the concentrate valve cavity 142 communicates with a concentrate outlet cavity 143 terminating in a concentrate outlet 149 that communicates with the concentrate introduction segment 132 of the venturi-shaped mixing pathway 130. The check valve 141 inserts into the concentrate valve cavity 142 at an aperture 144 of the concentrate valve cavity 142 until the check valve 141 abuts a stop 145 of the concentrate valve cavity 142 such that the check valve 141 feeds into a segment 150 of the concentrate valve cavity 142 communicating with the concentrate outlet cavity 143. A plug 146 inserts into the concentrate valve cavity 142 at the aperture 144 to seal the concentrate valve cavity 142. The plug 146 is sized to fluidly seal the concentrate valve cavity 142 while remaining spaced apart from the check valve 141 sufficiently to form a segment 148 of the concentrate pathway 139 into which the concentrate inlet conduit 140 communicates. A plug 147 inserts into the concentrate outlet cavity 143 at an aperture 151 to fluidly seal the concentrate outlet cavity 143 and form a concentrate outlet conduit 152 that communicates with the concentrate outlet 149. In the second embodiment, the concentrate pathway 139 accordingly includes the concentrate inlet conduit 140, the segment 148, the check valve 141, the segment 150, the concentrate outlet conduit 152, and the concentrate outlet 149, and concentrate entering the concentrate port 126 via the channel 203 of the valve body 111 flows through the concentrate inlet conduit 140, the segment 148, the check valve 141, the segment 150, the concentrate outlet conduit 152, and the concentrate outlet 149 prior to entering the venturi-shaped mixing pathway 130 at the concentrate introduction segment 132. While the check valve 141 may be any check valve suitable to operate with viscous concentrates, the check valve 141 in the second embodiment may be an 8 mm OD check valve available from NEOPERL, Inc., 171 Mattatuck Heights, Waterbury, Conn. 06705.

The nozzle housing 116 in the second embodiment includes a body 162 having an inlet surface 163 defining an inlet 167, an outlet surface 164 defining an outlet 168, an inner surface 165, and an outer surface 166. The body 162 along an upper segment 169 thereof includes a diameter sized to receive the mixer 115 therein. The body 162 along a lower segment 171 includes a diameter less than the diameter of the upper segment such that the lower segment 171 defines a shelf 170 that supports the mixer 115 thereon. The mixer 115 accepts a seal 161 thereabout that fluidly seals the mixer 115 within the nozzle housing 116. The lesser diameter of the body 162 along the lower segment 171 defines the outlet 168 such that the outlet 168 directs mixed diluent and concentrate to a container disposed under the post-mix drink dispenser 110.

The diffuser 117 in the second embodiment is formed integrally with the nozzle housing 116 in the lower segment 171 thereof although the diffuser 117 may be a separate piece inserted into the nozzle housing 116. The diffuser 117 includes a plate 177 having a raised portion. The plate 177 secures with the inner surface 165 of the nozzle housing 116 by arms 178 that define channels 179 between the inner surface 165 and the plate 177. In the second embodiment, there are four arms 178 formed integrally with the inner surface 165 of the nozzle housing 116 and the plate 177 such that there are four channels 179 that communicate with the outlet 168.

The post-mix drink dispenser 110 includes the diffuser 117 to reduce the velocity of the mixed diluent and concentrate exiting the venturi-shaped mixing pathway 130. In particular, the plate 177 of the diffuser 117 receives the exiting mixed diluent and concentrate thereon and spreads the exiting mixed diluent and concentrate along its surface. The spreading of the mixed diluent and concentrate along the plate 177 increases the surface area of the flowing mixed diluent and concentrate, thereby producing a corresponding reduction in their velocity. The diffuser 117 accordingly facilitates a uniform, stable, and consistent flow of mixed diluent and concentrate through the post-mix drink dispenser 110 due to its reduction in their velocity prior to their exit from the outlet 168 of the nozzle housing 116. It should be understood by one of ordinary skill in the art that, although the diffuser 117 enhances the delivery of diluent and concentrate from the post-mix drink dispenser 110, the post-mix drink dispenser 110 will operate satisfactorily if the diffuser 117 is omitted.

The post-mix drink dispenser 110 includes the nozzle cover 118 to house and protect the nozzle housing 116. The nozzle cover 118 in the second embodiment includes a body 180 having an inlet surface 181 defining an inlet, an outlet surface 182 defining an outlet, an inner surface 183, and an outer surface 184. The body 180 on the outer surface 184 below the inlet surface 181 defines a slot 186 that receives therein a lip 188 defined by the valve body 111 thereby securing the nozzle cover 118 with the valve body 111. The inlet surface 181 includes a seal 187 that fluidly seals the nozzle cover 118 against the valve body 111. The inner surface 183 of the body 180 is complementary in shape to the outer surface 166 of the body 162 for the nozzle housing 116, and the nozzle cover 118 is sized to receive the nozzle housing 116 therein in an abutting relationship that retains the nozzle housing 116 within the nozzle cover 118.

Incorporation of the post-mix drink dispenser 110 into the drink dispensing system 95 as illustrated in FIG. 10 begins with the assembly of the post-mix drink dispenser 110. The mixer 115 inserts through the inlet 167 of the nozzle housing 116 until the mixer 115 seats against the shelf 170. thereby positioning the venturi-shaped mixing pathway 130 above the plate 177 of the diffuser 117. The mixer 115 including the nozzle housing 116 inserts within the cavity 216 of the valve body 111 until the boss 120 at a top portion thereof abuts a section of the valve body 111 defining an upper portion of the cavity 216 and the inlet surface 122 abuts a section of the valve body 111 defining a lower portion of the cavity 203. The coupling of the mixer 115 with the valve body 111 closes the cavity 216 such that the diluent port 125 aligns with the outlet 217 of the channel 215 in the valve body 111 to receive diluent therein and deliver the diluent into the diluent inlet segment 131. The boss 120 accepts a seal 134 thereabout that fluidly seals the boss 120 within the cavity 216. The coupling of the mixer 115 with the valve body 111 further closes the cavity 203 such that the concentrate port 126 aligns with the outlet 204 of the channel 203 in the valve body 111 to receive concentrate therein and deliver the concentrate into the concentrate pathway 139. The nozzle cover 118 slides over the nozzle housing 116 until its slot 186 aligns with the lip 188 of the valve body 111 and the seal 187 abuts the valve body 111. Rotation of the nozzle cover 118 inserts the lip 188 within the slot 186 thereby securing the nozzle cover 118 and thus the mixer 115 with the valve body 111.

The drink dispensing system 95 includes a housing 211, which may be a tower securable to a suitable support platform such as a countertop or product cooling container. The housing 211 includes a diluent line that connects with a diluent source, such as a pressurized carbonated water system or a pressurized plain watersystem, either directly or through a cooling system such as a cold plate when cooled diluent is desired. The housing 211 includes a concentrate line that connects with a concentrate source, such as a bag in a box (BIB), either directly or through a cooling system such as a cold plate when cooled concentrate is desired. The concentrate source includes a pump to pump the concentrate through the drink dispensing system 95 and the post-mix drink dispenser 110. The concentrate pump may be any pump suitable to pump viscous concentrates, however, the pump in the second embodiment is a compressed gas operated piston pump well known to one of ordinary skill in the art.

The drink dispensing system 95 in the second embodiment includes a back block that connects at a diluent inlet with the diluent line and at a concentrate inlet with the concentrate line. The diluent inlet conduit 207 of the valve body 111 at an entrance thereto fits over a diluent outlet of the back block to facilitate diluent flow through the diluent delivery passageway 205. Likewise, the concentrate inlet conduit 194 of the valve body 111 at an entrance thereto fits over a concentrate outlet of the back block to facilitate concentrate flow through the concentrate delivery passageway 192. The wall 191 couples the valve body 111 with the back block using any suitable means such as a bar that inserts through apertures in the back block and the wall 191. After securing the valve body 111 with the back block, the cover 112 and the face plate 113 fit over the valve body 111, thereby completing the incorporation of the post-mix drink dispenser 110 into the drink dispensing system 95.

The operation of the post-mix drink dispenser 110 in delivering a drink will be described herein. A technician connects a diluent source with the diluent line of the drink dispensing system 95 to allow delivery of diluent from the diluent source through the diluent delivery passageway 205 and to the diluent port 125 of the mixer 115. The technician connects a concentrate containing BIB and pump with the concentrate line of the drink dispensing system 95 to allow delivery of concentrate from the concentrate containing BIB through the concentrate delivery passageway 192 and to the concentrate port 126 of the mixer 115.

Before dispensing a drink, a technician must configure the drink dispensing system 95 by setting the flow rates of the diluent and concentrate to the desired flow rate that achieves the volumetric flow rate ratios necessary for a proper tasting drink. Illustratively, the technician measures Brix and compares the measured Brix to a target Brix. The technician adjusts the flow rate controller 206 and the flow rate controller 193, which is preferably the flow rate controller 250, until the measured Brix corresponds with the target Brix. With respect to the flow rate controller 250, a technician rotates the adjustment screw 253 to vary the size of the entrance 280 and thus the flow rate of concentrate therethrough until the measured Brix substantially, completely equals the target Brix. Alternatively, the technician measures at least the flow rate of the diluent, and, if necessary, the flow rate of the concentrate. The technician then determines the adjustments necessary to produce the correct volumetric flow rate ratio (e.g., 24 to 1 diluent to concentrate). The technician adjusts the flow rate controller 206 until the actual flow rate of the diluent exiting the venturi-shaped mixing pathway 130 corresponds with the desired diluent flow rate. The technician adjusts the flow rate controller 193, which is preferably the flow rate controller 250, until the actual flow rate of the concentrate exiting the venturi-shaped mixing pathway 130 corresponds with the desired concentrate flow rate.

A user, typically with a container held below the nozzle cover 118, activates the lever 114, resulting in the flow of diluent from the diluent source through the diluent delivery passageway 205 and to the diluent port 125 of the mixer 115 as well as the flow of concentrate from the concentrate containing BIB through the concentrate delivery passageway 192 and to the concentrate port 126 of the mixer 115. In particular, the valve seal 213 moves from the inlet 214 of the channel 215 such that diluent flows through the diluent inlet conduit 207, the flow control chamber 208 with the flow rate controller 206 disposed therein, the valve chamber 212 with the valve seal 213 therein, and the channel 215 to the diluent port 125 of the mixer 115. Similarly, the valve seal 200 moves from the inlet 201 of the channel 202 such that concentrate flows through the concentrate inlet conduit 194, the flow control chamber 195 with the flow rate controller 193 disposed therein, the valve chamber 199 with the valve seal 200 therein, the channel 202, and the cavity 203 to the concentrate port 126 of the mixer 115.

The diluent flows through the diluent port 125 and into the venturi-shaped mixing pathway 130 of the mixer 115, Likewise, the concentrate flows through the concentrate port 126 and into the concentrate pathway 139 of the mixer 115. The concentrate enters the check valve 141, and, once the flow of the concentrate achieves the minimum operating pressure for the check valve 141, the check valve 141 opens to deliver the concentrate into the concentrate outlet 149 of the concentrate pathway 139.

The diluent inlet segment 131 of the venturi-shaped mixing pathway 130 receives the diluent therein where the decreasing cross-sectional area of the diluent inlet segment 131 constricts the flow of diluent thereby increasing its velocity and decreasing its pressure. The diluent inlet segment 131 delivers the diluent into the concentrate introduction segment 132 of the venturi-shaped mixing pathway 130 where the increasing cross-sectional area of the concentrate introduction segment 132 expands the flow of diluent thereby further decreasing its pressure. While the diluent flows through the concentrate introduction segment 132, the concentrate outlet 149 of the concentrate pathway 139 delivers the concentrate into the concentrate introduction segment 132. The decreased pressure of the diluent flowing through concentrate introduction segment 132 assists in drawing the concentrate into the diluent flow for mixing therewith. The mixing outlet segment 133 of the venturi-shaped mixing pathway 130 receives the mixed diluent and concentrate therein where the increasing cross-sectional area of the mixing outlet segment 133 decreases the velocity of the mixed diluent and concentrate prior to their exit from the mixing outlet segment 133 onto the diffuser 117. The mixed diluent and concentrate spreads along the diffuser 117 to further reduce their velocity. The mixed diluent and concentrate flows from the diffuser 117 into the nozzle housing 116 and then from the outlet 168 of the nozzle housing 116 into a container below the nozzle housing 116, thereby forming a drink for the user.

The post-mix drink dispenser 110 delivers a drink as long as the lever 114 remains activated. Upon deactivation of the lever 114, the valve seal 213 returns over the inlet 214 of the channel 215 such that diluent ceases to flow through the diluent delivery passageway 205 and thus the venturi-shaped mixing pathway 130 of the mixer 115. Concurrently, the valve seal 200 returns over the inlet 201 of the channel 202 such that concentrate ceases to flow through the concentrate delivery passageway 192 and thus the concentrate pathway 139 of the mixer 115. Once the valve seal 200 returns over the inlet 201 of the channel 202, the pressure of the concentrate within the concentrate pathway 139 rapidly diminishes below the minimum operating pressure of the check valve 141, resulting in the prompt closing of the check valve 141 and the prevention of concentrate ooze into the venturi-shaped mixing pathway 130.

The high diluent to concentrate volumetric ratio post-mix drink dispenser 5 according to the first embodiment of the present invention incorporated into the drink dispensing system 10 operates with the pumps 107 because the pumps 107 due to their precise electrical control deliver viscous concentrate at a substantially constant pressure that ensures a highly stable diluent to concentrate volumetric ratio. Nevertheless, one of ordinary skill in the art ill recognize that the drink dispensing system 10 in the first embodiment may include back blocks and flow rate controllers similar to the flow rate controller 193 disclosed in the second embodiment used in combination with a pump similar to the pump disclosed in the second embodiment to deliver the concentrate, additive, and diluent. Alternatively, one of ordinary skill in the art will recognize that the high diluent to concentrate volumetric ratio post-mix drink dispenser 110 according to the second embodiment of the present invention incorporated into the drink dispensing system 95 may operate with pumps similar to the pumps 107 disclosed in the first embodiment. The foregoing is accomplished through the elimination of the flow rate controller 193 and its replacement with a conduit or at least the setting of the flow rate controller 193 to a substantially full open position with the control of concentrate flow rate being achieved through the pumps.

Although the present invention has been described in terms of the foregoing preferred embodiment, such description has been for exemplary purposes only and, as will be apparent to those of ordinary skill in the a any alternatives, equivalents, and variations of varying degrees will fall within the scope of the present invention. That scope, accordingly, is not t limited in any respect by the foregoing detailed description; rather, it is defined only by the claims that follow.

The invention claimed is:

1. A method of dispensing a high diluent to concentrate volumetric ratio post-mix drink, comprising:
   delivering a diluent from a diluent source to a mixing pathway of a high diluent to concentrate volumetric ratio post-mix drink dispenser;
   delivering a concentrate from a concentrate source to a concentrate pathway of the high diluent to concentrate volumetric ratio post-mix drink dispenser, wherein the concentrate pathway communicates concentrate into the mixing pathway, further wherein delivering the diluent to the mixing pathway and the concentrate to the concentrate pathway, comprises:
   measuring a flow rate of the diluent,
      determining a desired diluent flow rate and a desired concentrate flow rate that produces a correct high diluent to concentrate volumetric flow rate ratio,
      adjusting the flow rate of the diluent to the desired diluent flow rate, and
      adjusting a flow rate of the concentrate to the desired concentrate flow rate;
   manipulating a flow of the diluent through the mixing pathway to decrease the pressure thereof, thereby creating a low pressure region at the concentrate pathway that promotes introduction of the concentrate into the diluent for mixing therewith; and
   delivering the mixed diluent and concentrate from the high diluent to concentrate volumetric ratio post-mix drink dispenser.

2. The method of dispensing a high diluent to concentrate volumetric ratio post-mix drink according to claim 1, wherein manipulating the flow of the diluent through the mixing pathway, comprises:
   flowing the diluent through a diluent inlet segment that tapers in a decreasing cross-sectional area such that the diluent inlet segment constricts the diluent flow thereby increasing diluent velocity and decreasing diluent pressure;
   flowing the diluent through a concentrate introduction segment that includes a cross-sectional area greater than the diluent inlet segment such that the concentrate introduction segment relieves the constriction to the diluent flow thereby decreasing diluent pressure and creating a low pressure region in the concentrate introduction segment at the concentrate pathway that promotes introduction of the concentrate into the diluent for mixing therewith; and
   flowing the diluent through a mixing outlet segment that expands in an increasing cross-sectional area away from the concentrate introduction segment, thereby decreasing the velocity of the mixed diluent and concentrate prior to their exit from the mixing outlet segment.

3. The method of dispensing a high diluent to concentrate volumetric ratio post-mix drink according to claim 1, wherein delivering the concentrate comprises flowing the concentrate to the mixing pathway only after the concentrate reaches a minimum pressure.

4. The method of dispensing a high diluent to concentrate volumetric ratio post-mix drink according to claim 3, wherein delivering the concentrate comprises ceasing concentrate flow to the mixing pathway when concentrate pressure drops below the minimum pressure.

5. The method of dispensing a high diluent to concentrate volumetric ratio post-mix drink according to claim 1, further comprising reducing the velocity of the mixed diluent and concentrate exiting the mixing pathway prior to delivery of the mixed diluent and concentrate from the high diluent to concentrate volumetric ratio post-mix drink dispenser.

6. The method of dispensing a high diluent to concentrate volumetric ratio post-mix drink according to claim 1, wherein adjusting the flow rate of the concentrate to the desired concentrate flow rate, comprises adjusting a voltage applied to a pump that pumps concentrate to the concentrate pathway, whereby a voltage increase increases concentrate flow rate to the concentrate pathway and a voltage decrease decreases concentrate flow rate to the concentrate pathway.

7. The method of dispensing a high diluent to concentrate volumetric ratio post-mix drink according to claim 1, wherein adjusting the flow rate of the concentrate to the desired concentrate flow rate, comprises adjusting a duty cycle applied to a pump that pumps concentrate to the concentrate pathway, whereby an increase in duty cycle duration increases concentrate flow rate to the concentrate pathway and a decrease in duty cycle duration decreases concentrate flow rate to the concentrate pathway.

8. A method of making a flow rate controller, comprising:
   molding a body from a plastics material, the body, comprising:
      an inlet section defining an inlet channel interior thereto,
      an exit section adjacent the inlet section, the exit section defining an exit channel interior thereto that communicates with the inlet channel and terminates in an exit aperture elongated with a length to width ratio of greater than 4:1, and
      an adjustment section adjacent the exit section, the adjustment section defining interior thereto an adjustment cavity communicating with an adjustment channel that communicates with the exit channel;
   machining an insert from a metal, the insert defining a passage therethrough whereby an interior surface of the insert includes threads having a thread count of greater than 24 threads per 1 inch;
   machining an adjustment screw from a plastics material, the adjustment screw comprising:
      a head including an exterior surface having threads with a thread count of greater than 24 threads per 1 inch whereby the threads of the head are sized to engage the threads of the insert, and
      a shank coupled with the head;
   placing the insert within the adjustment section; and
   engaging the head of the adjustment screw with the insert, wherein the shank of the adjustment screw extends into the exit channel, further wherein movement of the head within the insert concurrently moves the shank in the exit channel among a closed position that seals the inlet channel to prevent flow into the exit channel and through the exit aperture, intermediate positions that permit partial flow from the inlet section into the exit channel and through the exit aperture, and a fully open position that permits full flow from the inlet section into the exit channel and through the exit aperture.

9. The method of making a flow rate controller according to claim 8, wherein molding the body comprises sizing the inlet section and the adjustment section to frictionally engage a flow control chamber and the exit section such that the exit section is spaced apart from the flow control chamber to create an exit chamber in the flow control chamber that communicates with an outlet thereof.

10. The method of making a flow rate controller according to claim 8, wherein molding the body comprises forming the exit aperture as an elongated slot with a length to width ratio of greater than 4:1 in order to necessitate travel of the shank away from the inlet channel a preset minimum before concentrate flow through the exit channel and from the exit aperture achieves a rate sufficient for a precise and final adjustment of flow rate therethrough to a desired concentrate flow rate.

11. The method of making a flow rate controller according to claim 10, wherein machining the insert and the head of the adjustment screw with a thread count of greater than 24 threads per 1 inch facilitates precise incremental movements of the shank within the exit channel relative to the inlet channel such that precise incremental adjustments in concentrate flow rates through the flow rate controller are achieved.

12. The method of making a flow rate controller according to claim 8, wherein molding the body comprises forming the exit aperture with a length to width ratio of up to 8.9:1.

13. The method of making a flow rate controller according to claim 8, wherein machining the insert and the head of the adjustment screw comprises the insert and the head including a thread count of up to 50 threads per 1 inch.

* * * * *